US012633310B2

(12) United States Patent
Maeto

(10) Patent No.: US 12,633,310 B2
(45) Date of Patent: May 19, 2026

(54) MAGNETIC DISK APPARATUS AND METHOD

(71) Applicants: Kabushiki Kaisha Toshiba, Tokyo (JP); Toshiba Electronic Devices & Storage Corporation, Tokyo (JP)

(72) Inventor: Nobuhiro Maeto, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/964,160

(22) Filed: Nov. 29, 2024

(65) Prior Publication Data

US 2026/0024552 A1　　Jan. 22, 2026

(30) Foreign Application Priority Data

Jul. 18, 2024　　(JP) ................................. 2024-114717

(51) Int. Cl.
　　*G11B 20/18*　　(2006.01)
　　*G11B 5/596*　　(2006.01)
(52) U.S. Cl.
　　CPC ...... *G11B 20/1833* (2013.01); *G11B 5/59627* (2013.01)
(58) Field of Classification Search
　　None
　　See application file for complete search history.

(56) References Cited

U.S. PATENT DOCUMENTS

| | | | |
|---|---|---|---|
| 6,822,818 | B2 | 11/2004 | Hamaguchi et al. |
| 10,748,567 | B1 | 8/2020 | Zaitsu et al. |
| 11,817,123 | B2 | 11/2023 | Maeto |
| 2003/0112728 | A1* | 6/2003 | Ono ........................ G11B 19/04 |
| | | | 369/53.37 |
| 2005/0193289 | A1* | 9/2005 | Chung ............... G11B 20/1833 |
| | | | 386/E5.064 |
| 2005/0281156 | A1* | 12/2005 | Watanabe ............ G11B 7/0946 |
| 2006/0098542 | A1* | 5/2006 | Kuwayama ........... G11B 27/36 |
| 2007/0076551 | A1* | 4/2007 | Shimakawa ......... G11B 7/1267 |
| 2022/0301588 | A1* | 9/2022 | Popov ................ G11B 20/1037 |
| 2023/0260540 | A1 | 8/2023 | Maeto |
| 2023/0335158 | A1* | 10/2023 | Ravindran ........... G11B 5/5586 |
| 2024/0046961 | A1* | 2/2024 | Popov ................ G11B 5/59655 |

FOREIGN PATENT DOCUMENTS

JP　　　2023-119547 A　　8/2023

* cited by examiner

*Primary Examiner* — Peter Vincent Agustin
(74) *Attorney, Agent, or Firm* — Kim & Stewart LLP

(57)　　　　ABSTRACT

A controller calculates, based on a positional error signal, an evaluation amount of damage on data of an adjacent track caused by a write operation, and compares a first amount being the evaluation amount with a first threshold value corresponding to a correction limit of an error correction in units of tracks. The controller interrupts the write operation in response to determining that the first amount is greater than the first threshold value. The controller executes a read operation on the adjacent track, acquires a metric representing a signal quality of the data of the adjacent track read by the read operation, calculates the evaluation amount based on the metric, and compares a second amount being the evaluation amount with the first threshold value. The controller continues the write operation in response to determining that the second amount is smaller than a first threshold value.

18 Claims, 11 Drawing Sheets

FIG.1

TRACK
41

MAGNETIC DISK
11

ROTATION
DIRECTION

WRITE/
READ DIRECTION

42
SERVO AREA

43
DATA AREA

OUTER SIDE

RADIAL
DIRECTION

WHw   TW

Track #1

Track #2

Track #3

Track #4

Track #5

ORDER OF
WRITE

INNER SIDE

HISTORY IN WHICH FIRST SQUEEZE AMOUNT SQ1
EXCEEDS SQUEEZE AMOUNT THRESHOLD VALUE $Th_{SQ}$

HISTORY IN WHICH SECOND SQUEEZE AMOUNT SQ2
EXCEEDS SQUEEZE AMOUNT THRESHOLD VALUE $Th_{SQ}$

MAGNETIC DISK APPARATUS AND METHOD

CROSS-REFERENCE TO RELATED APPLICATIONS

This application is based upon and claims the benefit of priority from Japanese Patent Application No. 2024-114717, filed on Jul. 18, 2024; the entire contents of which are incorporated herein by reference.

FIELD

Embodiments described herein relate generally to a magnetic disk apparatus and a method.

BACKGROUND

There is a magnetic disk apparatus having a function of protecting data written to each track in units of tracks. Error correction in units of tracks is referred to as track error correction. In a case where there is a possibility that data of an adjacent track cannot be corrected by track error correction due to writing to a write target track in a magnetic disk apparatus having a track error correction function, the magnetic disk apparatus terminates writing to the write target track and executes a protection operation for protecting the data of the adjacent track.

BRIEF DESCRIPTION OF THE DRAWINGS

FIG. 1 is a schematic diagram illustrating an example of a configuration of a magnetic disk apparatus according to the embodiment;

DETAILED DESCRIPTION

Figure 2:
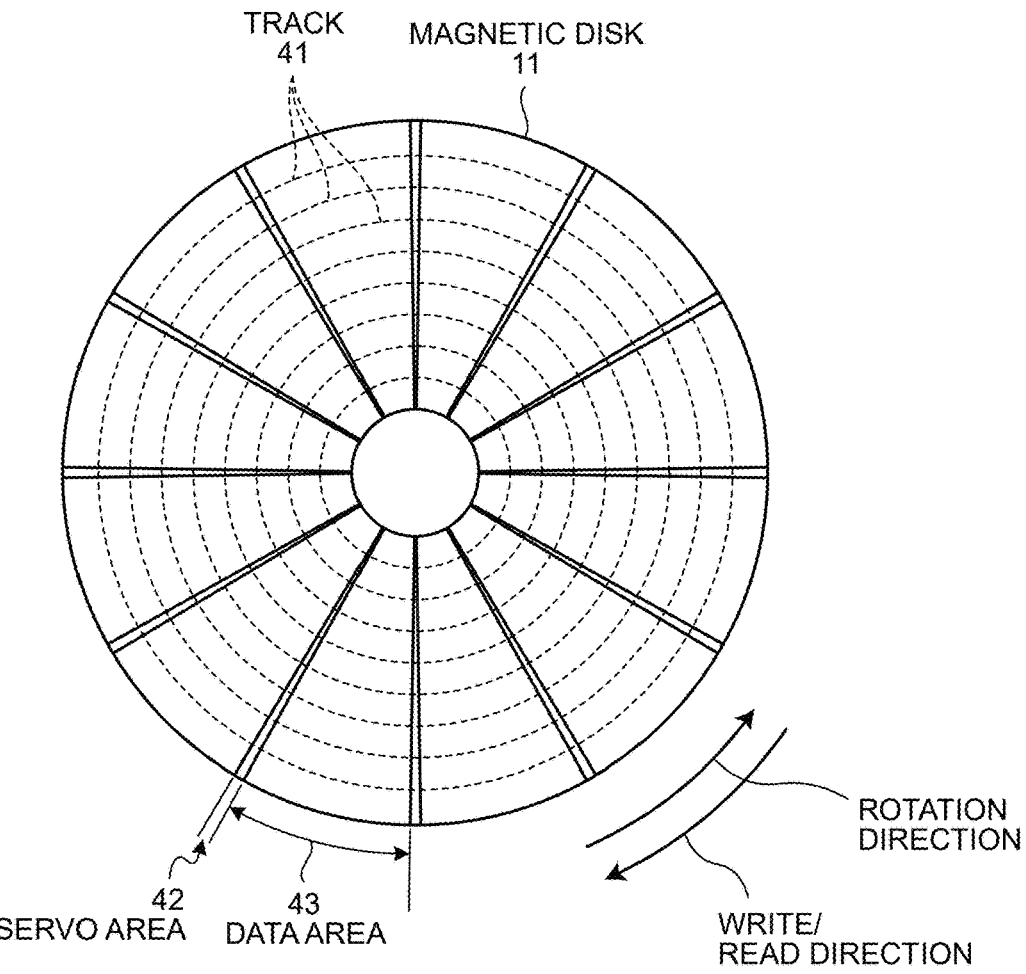
FIG. 2 is a schematic diagram illustrating an example of a configuration of a magnetic disk according to the embodiment.

According to the present embodiment, a magnetic disk apparatus includes a magnetic disk, a magnetic head, and a controller. The magnetic disk includes tracks on which servo sectors storing servo information are disposed at intervals in a circumferential direction. The tracks include a first track and a second track. The second track is radially adjacent to the first track and is subject to writing earlier of the first track. Each of the first track and the second track includes data sectors. The data sectors include a data sector in which an error correction code for error correction in units of tracks is stored. The magnetic head is configured to write data and read data to and from the magnetic disk. The controller is configured to read servo information when the magnetic head passes over each of the servo sectors, acquire a positional error signal of the magnetic head based on the read servo information, and execute a write operation on the first track while executing positioning of the magnetic head on the first track based on the positional error signal. The controller is configured to execute a first operation during the write operation in response to the magnetic head passing over a first servo sector being one of the servo sectors. The first operation is executed by calculating, based on the positional error signal, an evaluation amount of damage on data of the second track caused by the write operation and comparing a first amount being the evaluation amount calculated based on the positional error signal with a first threshold value corresponding to a correction limit of error correction in units of the tracks. The controller is configured to execute a second operation by interrupting the write operation in response to determining that the first amount is larger than the first threshold value in the first operation. The second operation is executed by executing a read operation on the second track, acquiring a metric representing signal quality of data of the second track read by the read operation, calculating the evaluation amount based on the metric, and comparing a second amount being the evaluation amount calculated based on the metric with the first threshold value. The controller is configured to continue the write operation on the first track in response to determining that the first amount is smaller than the first threshold value in the first operation or determining that the second amount is smaller than the first threshold value in the second operation. The controller is configured to execute a protection operation of protecting data of the first track in response to determining that the second amount is larger than the first threshold value in the second operation.

Hereinafter, a magnetic disk device and a method according to the embodiment will be described in detail with reference to the accompanying drawings. In addition, the present invention is not limited by the following embodiment.

Embodiment

Figure 1:
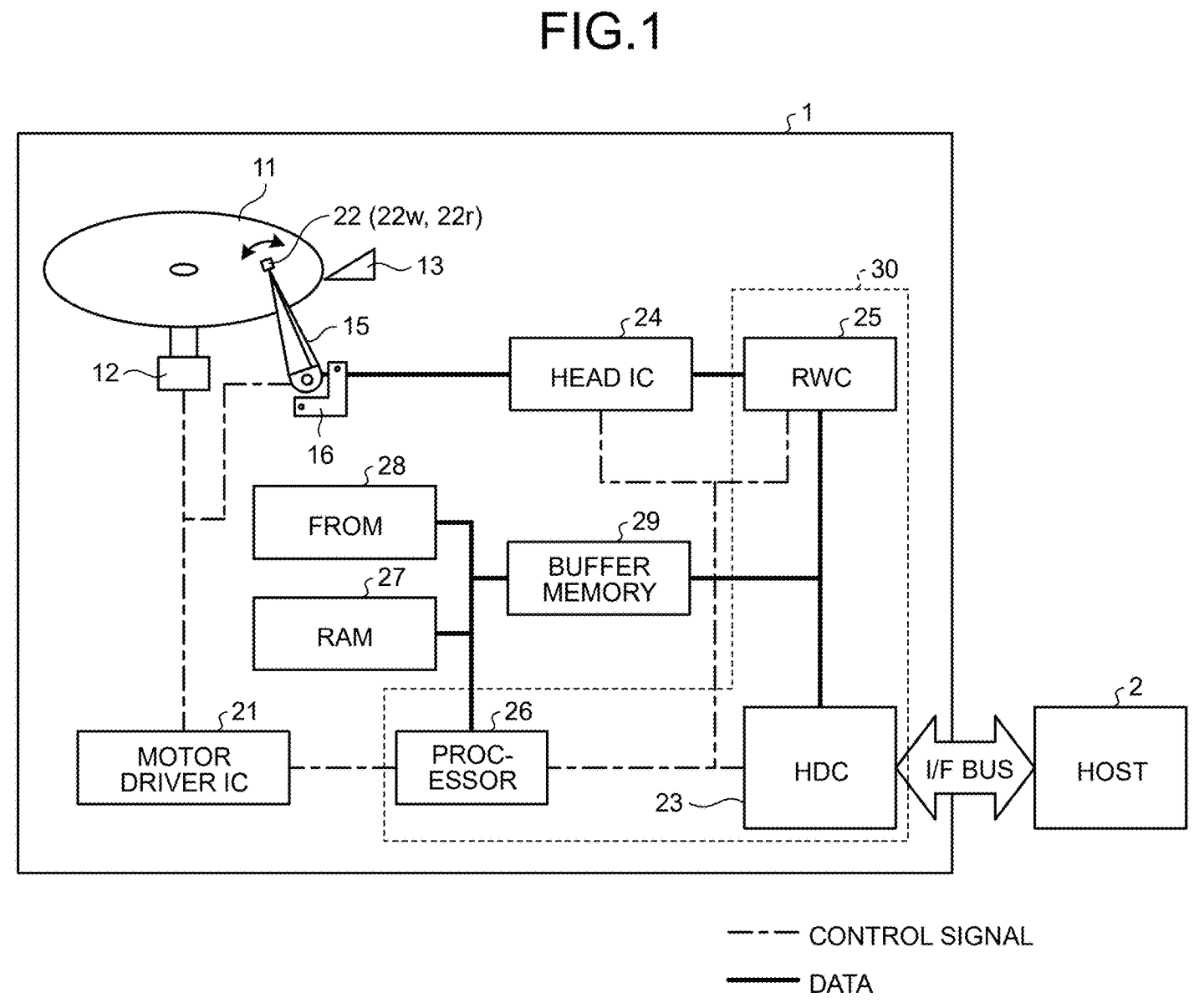

FIG. 1 is a schematic diagram illustrating an example of a configuration of a magnetic disk apparatus 1 according to the embodiment.

The magnetic disk apparatus 1 is connected to a host 2. The magnetic disk apparatus 1 can receive an access command such as a write command or a read command from the host 2.

The magnetic disk apparatus 1 includes a magnetic disk 11 having a recording face formed on a face thereof. The magnetic disk apparatus 1 writes and reads data to and from the magnetic disk 11 (more precisely, the recording face of the magnetic disk 11) in response to the access command. Note that the magnetic disk apparatus 1 may include two or more magnetic disks 11, whereas, in the embodiment, the magnetic disk apparatus 1 includes one magnetic disk 11 for the sake of simplicity of description and illustration.

Data is written and read via a magnetic head 22. Specifically, in addition to the magnetic disk 11, the magnetic disk apparatus 1 includes a spindle motor 12, a motor driver integrated circuit (IC) 21, a magnetic head 22, an actuator arm 15, a voice coil motor (VCM) 16, a ramp 13, a head IC 24, a read/write channel (RWC) 25, a RAM 27, a flash read only memory (FROM) 28, a buffer memory 29, a hard disk controller (HDC) 23, and a processor 26.

The magnetic disk 11 is rotated at a predetermined rotation speed by the spindle motor 12 attached to a rotation shaft of the magnetic disk 11. The spindle motor 12 is driven by the motor driver IC 21.

The motor driver IC 21 controls the rotation of the spindle motor 12 and the rotation of the VCM 16.

The magnetic head 22 writes and reads data to and from the magnetic disk 11 using a write element 22w and a read element 22r provided therein. The magnetic head 22 is attached to a distal end of the actuator arm 15. The magnetic head 22 is moved along the radial direction of the magnetic disk 11 by the VCM 16 driven by the motor driver IC 21.

For example, when the rotation of the magnetic disk 11 is stopped, the magnetic head 22 is moved onto the ramp 13. The ramp 13 is configured to hold the magnetic head 22 at a position spaced apart from the magnetic disk 11.

The head IC 24 amplifies and outputs a signal read from the magnetic disk 11 by the magnetic head 22 at the time of read operation, and supplies the signal to the RWC 25. In addition, the head IC 24 amplifies a signal corresponding to the data to be written supplied from the RWC 25 and supplies the amplified signal to the magnetic head 22 during the write operation.

The HDC 23 controls transmission and reception of data with the host 2 via the I/F bus, controls the buffer memory 29, and the like.

The buffer memory 29 is used as a buffer for data to be transmitted to and received from the host 2. For example, the buffer memory 29 is used for temporarily storing data to be written to the magnetic disk 11 or data read from the magnetic disk 11.

The buffer memory 29, for example, includes a volatile memory capable of high-speed operation. The type of the memory constituting the buffer memory 29 is not limited to a specific type. The buffer memory 29 can be configured by, for example, a dynamic random access memory (DRAM), a static random access memory (SRAM), or a combination thereof.

The RWC 25 performs modulation including error correction coding on data to be written supplied from the HDC 23, and supplies the modulated data to the head IC 24. In addition, the RWC 25 performs demodulation including error correction and the like on a signal read from the magnetic disk 11 and supplied from the head IC 24, and outputs data obtained by the demodulation to the HDC 23.

The processor 26 is, for example, a central processing unit (CPU). The RAM 27, the flash read only memory (FROM) 28, and the buffer memory 29 are connected to the processor 26.

The FROM 28 is a nonvolatile memory. The FROM 28 stores firmware (program data), various operation parameters, and the like. The firmware may be stored in the magnetic disk 11.

The RAM 27 includes, for example, a DRAM, an SRAM, or a combination thereof. The RAM 27 is used as an operation memory by the processor 26. The RAM 27 is used as an area in which firmware is loaded and an area in which various types of management data are held.

The processor 26 performs overall control of the magnetic disk apparatus 1 according to a firmware stored in the FROM 28 or the magnetic disk 11. For example, the processor 26 loads firmware from the FROM 28 or the magnetic disk 11 to the RAM 27, and executes control of the motor driver IC 21, the head IC 24, the RWC 25, the HDC 23, and the like according to the loaded firmware.

Note that a configuration including the RWC 25, the processor 26, and the HDC 23 can also be regarded as a controller 30. The controller 30 may be configured as a system-on-a-chip (SoC). The controller 30 is not necessarily configured as a SoC. In addition to these components, the controller 30 may include other components (for example, the RAM 27, the FROM 28, the buffer memory 29, the RWC 25, or the like.).

FIG. 2 is a schematic diagram illustrating an example of a configuration of a magnetic disk 11 according to the embodiment. This figure illustrates an example of the rotation direction of the magnetic disk 11. The magnetic head 22 moves relative to the magnetic disk 11 by the rotation of the magnetic disk 11. Therefore, the write/read direction, namely, the direction in which data is written or read by the magnetic head 22 along the circumferential direction is opposite to the rotation direction of the magnetic disk 11.

Servo information is written to the magnetic disk 11 by, for example, a servo writer or self-servo write (SSW) in a manufacturing process. FIG. 2 illustrates servo areas 42 radially disposed as an example of the arrangement of the servo areas in which the servo information is written. A data area 43 in which data can be written is provided between servo areas 42.

In the radial direction of the magnetic disk 11, concentric tracks 41 are provided based on the servo information. In the data areas 43, data sectors in which data is written are provided along the track 41.

The servo information includes a servo mark, a gray code, a burst pattern, and a post code. When writing data to a data sector or reading data from a data sector, the controller 30 generates a positional error signal (PES) based on servo information read from the servo area 42 by the magnetic head 22. The PES indicates a deviation amount in the radial direction from the track center of the target track. The controller 30 executes positioning of the magnetic head 22, namely, seek control and tracking control based on the PES acquired each time the magnetic head 22 passes over the servo area 42. For example, before the start of the write operation, the controller 30 executes seek control to move the magnetic head 22 to the write target track 41. Then, tracking control of maintaining the magnetic head 22 on the write target track 41 is executed during a period from immediately before the start of the write operation to the end of the write operation.

Hereinafter, a portion of the track 41 divided by the servo area 42 is referred to as a servo sector SV. Since the plurality of servo areas 42 is radially disposed, it can be considered that a plurality of servo sectors SV is disposed at intervals in the circumferential direction in each track 41.

Hereinafter, data in units of data sectors to be written to each data sector is referred to as a data piece.

As a method of writing data on a magnetic disk, a method called shingled magnetic recording (SMR) and a method called conventional magnetic recording (CMR) are known. In the embodiment, the controller 30 is configured to write data requested to be written by the host 2 to the magnetic disk 11 by the SMR method.

Figure 3:
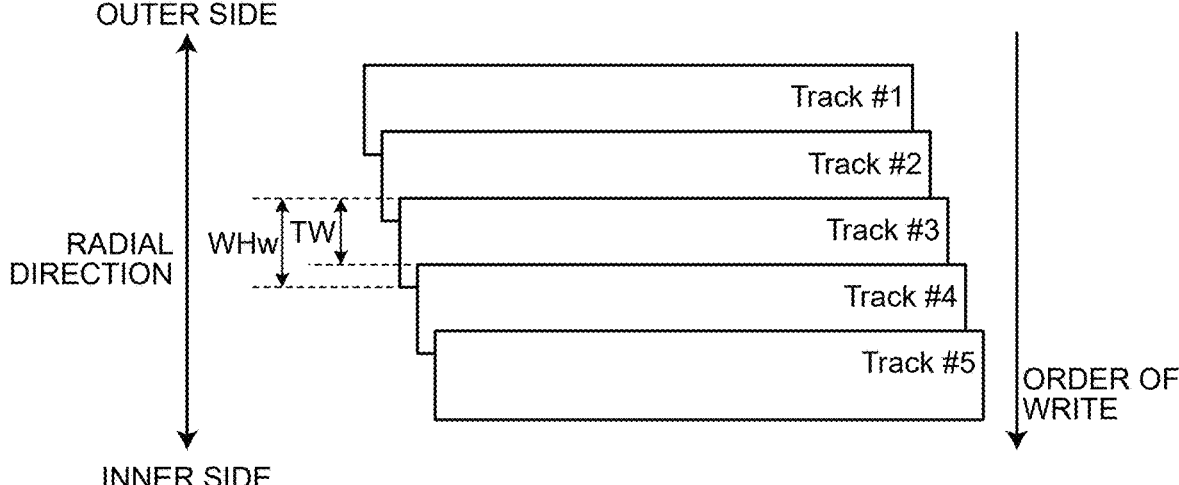
FIG. 3 is a schematic diagram for describing an SMR method used in the magnetic disk apparatus of the embodiment.

FIG. 3 is a schematic diagram for describing an SMR method used in the magnetic disk apparatus 1 of the embodiment. In the SMR method, in a case where data (referred to as first data) of a certain track 41 is written and then data (referred to as second data) of a track 41 radially adjacent to the track 41 is written, respective tracks 41 are disposed such that the second data overlaps part of the first data. That is, according to the SMR method, data of one track 41 of the two tracks 41 adjacent to each other in the radial direction of the magnetic disk 11 is written to overlap part of data of another track of the two tracks 41.

For example, the data of the track #2 is written so as to overlap part of the already written data of the track #1. In addition, the data of the track #3 is written so as to overlap part of the already written data of the track #2. That is, according to the SMR method, data of one track repeatedly overlaps part of data of the already written adjacent track.

As a result, each track width TW is narrowed compared to the width (WHw) of the write element 22w, and the recording density is improved.

However, according to the SMR method, since the track width TW is narrower than the width WHw of the write element 22w, when part of data of tracks is updated, data of a track adjacent to the updated data is destroyed. In order to prevent data destruction, data of tracks including the part of data is collectively updated. An area of tracks which is collectively updated is referred to as a band area.

In addition, according to the SMR method, writing can be executed only from one of the outer side end portion the and the inner side end portion of the magnetic disk determined in advance toward the other determined in advance of the tracks 41 in one band area. In the example illustrated in FIG. 3, write is executed in units of tracks 41 from the outer side end portion toward the inner side end portion. The controller 30 may be configured such that write is executed in units of tracks 41 from the inner side end portion toward the outer side end portion. In addition, the order of write may be individually set for each band area.

In the following description, it is assumed that track numbers corresponding to the arrangement order in the radial direction are given to respective tracks 41 included in the band area, and writing is executed in units of tracks 41 in the order of track numbers in the SMR method.

Moreover, in a case where a track 41 on which writing is performed later of the two tracks 41 adjacent to each other is used as a reference, a track 41 on which writing is performed earlier of the two tracks 41 is simply referred to as an adjacent track in the present specification. That is, when the track #p is used as a reference, the track #(p–1) corresponds to the adjacent track for the track #p.

Figure 4:
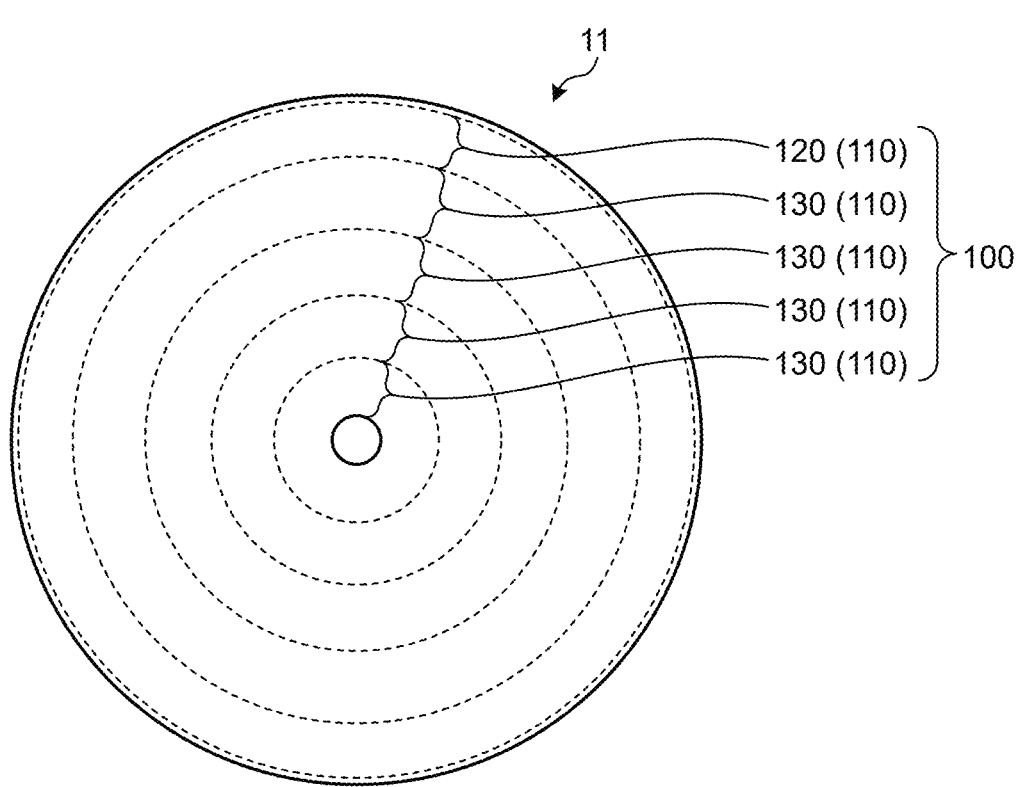
FIG. 4 is a diagram illustrating an example of a plurality of band areas provided in the magnetic disk according to the embodiment.

FIG. 4 is a diagram illustrating an example of a plurality of band areas provided in the magnetic disk 11 according to the embodiment.

A recording face 100 of the magnetic disk 11, namely, an area where the track 41 can be disposed, is divided into storage areas 110 in the radial direction. The storage areas

110 include one media cache area 120 and a plurality of band areas 130. An area called a guard area that cannot be designated as a write destination from the host 2 is provided between the storage areas 110. In FIG. 4, illustration of the guard area is omitted.

The storage area 110 provided on the outermost side in the radial direction in the recording face 100 is set as the media cache area 120. The media cache area 120 is a storage area used as a temporary storage location of data. Note that the position of the media cache area 120 is not limited to the outermost side. In addition, two or more media cache areas 120 may be provided on the recording face. Data can be written to the media cache area 120 by the CMR method.

Note that the CMR method is a method in which data of two tracks 41 adjacent to each other in the radial direction of the magnetic disk 11 is written so as not to overlap each other. According to the CMR method, since the width of each track 41 is the same as the width (WHw) of the write element 22w, data at an optional position can be updated.

Each band area 130 is provided with a plurality of tracks 41. Data is written in each band area 130 by the SMR method. The maximum amount of user data written in each band area 130, namely, the storage capacity is common to all the band areas 130.

Note that some of the band areas 130 may be configured such that data is written by the CMR method.

When the write operation on one track 41 is executed, the magnetic head 22 may vibrate due to an external factor or the like. When the magnetic head 22 deviates from the track center toward the adjacent track during the write operation on the write target track 41, the width of the adjacent track is narrowed according to the deviation amount of the magnetic head 22 toward the adjacent track. Alternatively, when the locus of the adjacent track deviates toward the write target track 41, the width of the adjacent track is narrowed even if the magnetic head 22 does not deviate toward the adjacent track during the write operation on the write target track 41. The amount by which the width of the adjacent track is reduced from the width of the adjacent track in design by the write operation is referred to as a squeeze amount.

When the squeeze amount is larger than a predetermined amount, the magnetic field of the magnetic head 22 interferes with the data written in the adjacent track, and thus the data may be damaged. Moreover, according to the SMR method, since the track width TW is narrower than that of the CMR method or the like, the data of the adjacent track is greatly affected by the vibration of the magnetic head 22.

The controller 30 has an error correction function so that the original data can be restored at the time of reading even if the data of the adjacent track is damaged by narrowing the width of the adjacent track. Specifically, the controller 30 has a function of sector error correction and a function of track error correction.

Figure 5:
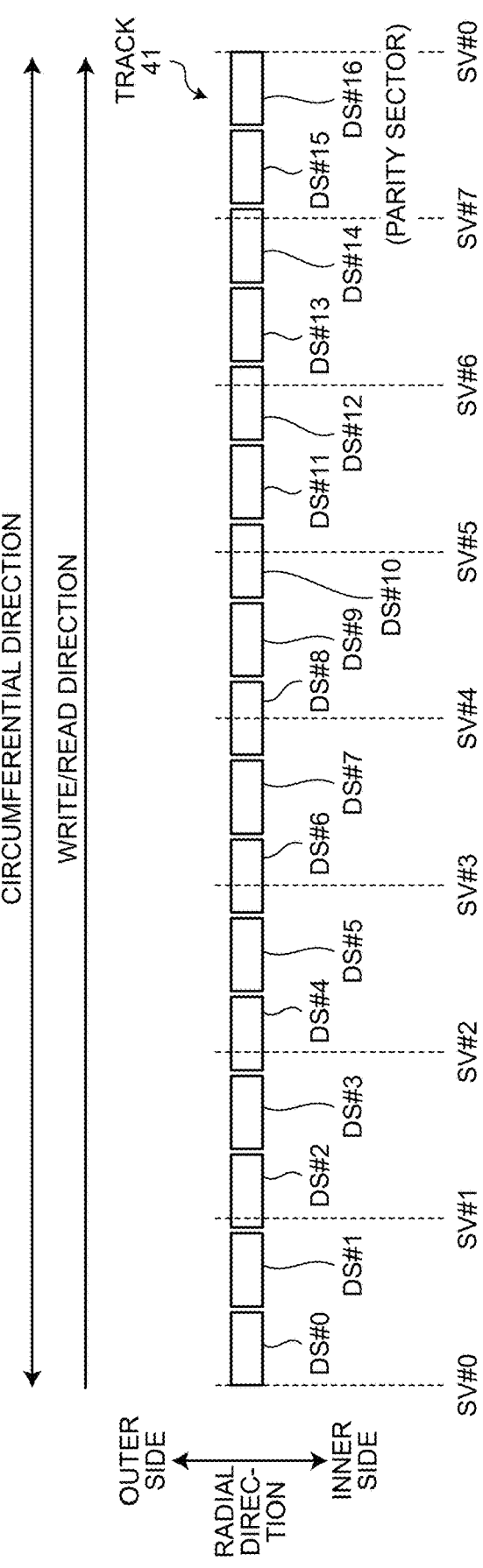
FIG. 5 is a diagram for describing an error correction function included in the controller according to the embodiment.

FIG. 5 is a diagram for describing an error correction function included in the controller 30 according to the embodiment. In the drawing, an example of a configuration of one track 41 is illustrated. An error correction function will be described based on the configuration of the track 41.

In the track 41, plural servo sectors SV are disposed at intervals in the circumferential direction. A servo sector ID is given to each servo sector SV. The servo sector SV to which the servo sector ID of "X" is given is referred to as a servo sector SV #X. According to the example illustrated in FIG. 5, eight servo sectors SV are disposed in one track 41. Then, numerical information corresponding to the positional order with the circumferential position at which the write operation on the track 41 is started as a reference position is given to each of the 8 servo sectors SV as a servo sector ID.

In one track 41, a large number of data sectors DS are disposed. A data sector ID is given to each data sector DS in the track 41. The data sector DS to which the data sector ID of "Y" is given is referred to as a data sector DS #Y. In the example illustrated in FIG. 5, 17 data sectors DS are disposed in one track 41. Then, numerical information corresponding to the positional order along the track 41 from the reference position is given to each the 17 data sectors DS as a data sector ID.

Hereinafter, a data piece scheduled to be written in the data sector DS #Y and a data piece written in the data sector DS #Y will be referred to as a data piece #Y.

In the circumferential direction of the track 41, the head and the end are defined based on the reference position and the write/read direction.

For example, a position where the magnetic head 22 passes over first within a section from when the magnetic head 22 passes over the reference position to when the magnetic head passes over the reference position next is referred to as a track head. A position where the magnetic head 22 passes over last within a section from when the magnetic head 22 passes over the reference position to when the magnetic head passes over the reference position next is referred to as a track end. The data sector DS located at the track head, namely, the data sector DS #0 is referred to as a head data sector DS. The data sector DS located at the track end, namely, the data sector DS #16 is referred to as an end data sector DS.

The data piece written to each data sector DS is subjected to error correction coding by the RWC 25. That is, the data piece stored in each data sector DS includes the error correction code. The RWC 25 can perform error correction on a data piece read from one data sector DS in units of data sectors DS using an error correction code. The error correction in units of data sectors DS is referred to as sector error correction. Failure of sector error correction is referred to as a sector read error. The failure of the error correction means that the read data cannot be restored to data equivalent to the original data by the error correction.

The method of error correction coding for sector error correction is not limited to a specific method. In one example, a low-density parity-check code is applied as a method of error correction coding for sector error correction.

The data sector DS #16, which is the end data sector DS, is a parity-dedicated data sector DS. The write to the track 41 is executed as follows. First, data pieces are written to the data sector DS #0 to the data sector DS #15 in the order of the data sector numbers. The parity calculated based on the group of data pieces written in the data sector DS #0 to the data sector DS #15 is written in the data sector DS #16.

The parity written in the data sector DS #16 protects a group of data pieces written in the data sector DS #0 to the data sector DS #15 from the occurrence of an error. Even if the sector read error occurs in some data pieces in the data sector DS #0 to the data sector DS #15, it is possible to restore the data piece in which the sector read error has occurred by the error correction using the parity written in the data sector DS #16. That is, the parity written in the data sector DS #16 protects the data in units of tracks. The parity written in the data sector DS #16 is referred to as a track parity. Error correction using the track parity is referred to as track error correction.

A method of calculating the track parity is not limited to a specific method. In one example, the track parity is generated by executing XOR for each bit position on a group of data pieces written in the data sector DS #0 to the data sector DS #15.

There is a correction limit in track error correction. Therefore, track error correction may fail. A track error correction failure is referred to as a track read error. When a track read error occurs, data recovery may eventually become impossible. Therefore, the controller 30 executes various types of control in the write operation in order to prevent a track read error. When the track read error is estimated to occur, the controller 30 immediately ends the write operation on the write target track 41 and executes the operation for protecting the data of the adjacent track from being unrecoverable. An operation for protecting data of an adjacent track from being unrecoverable is referred to as a protection operation.

As the protection operation, various operations can be executed. Two examples of the protection operation will be described below.

Figure 6:
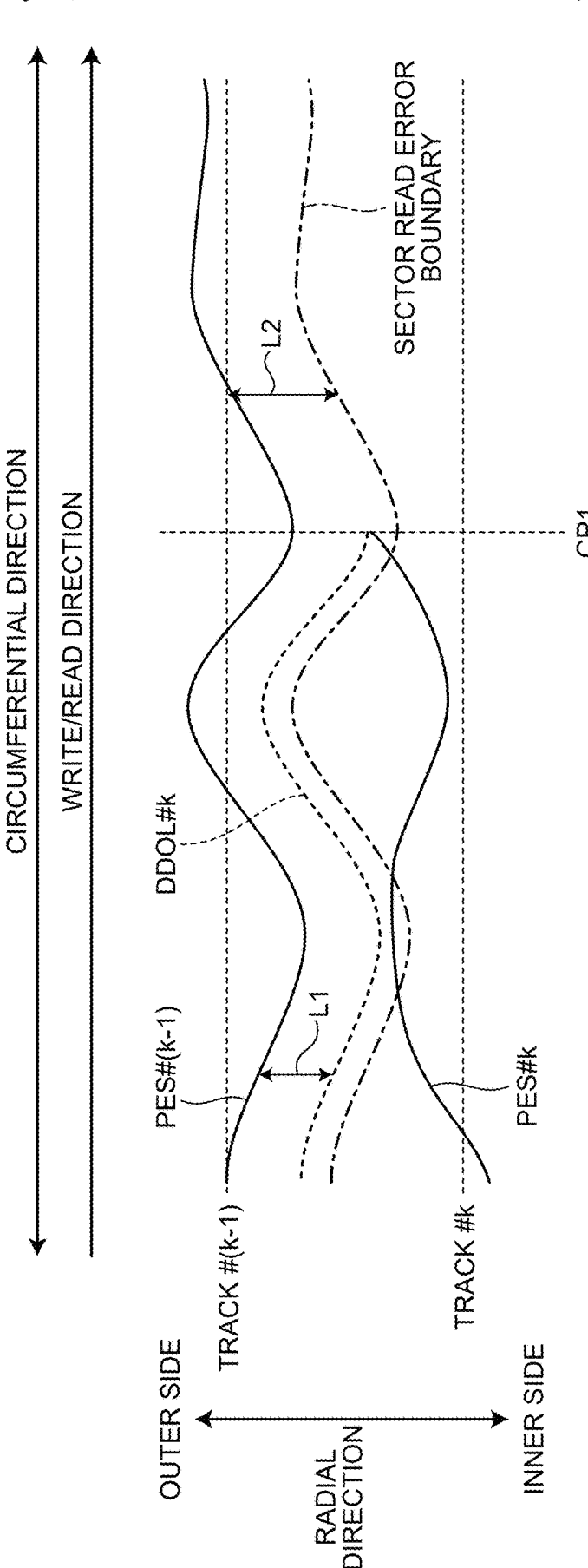
FIG. 6 is a diagram for describing an example of a protection operation according to the embodiment.
Figure 7:
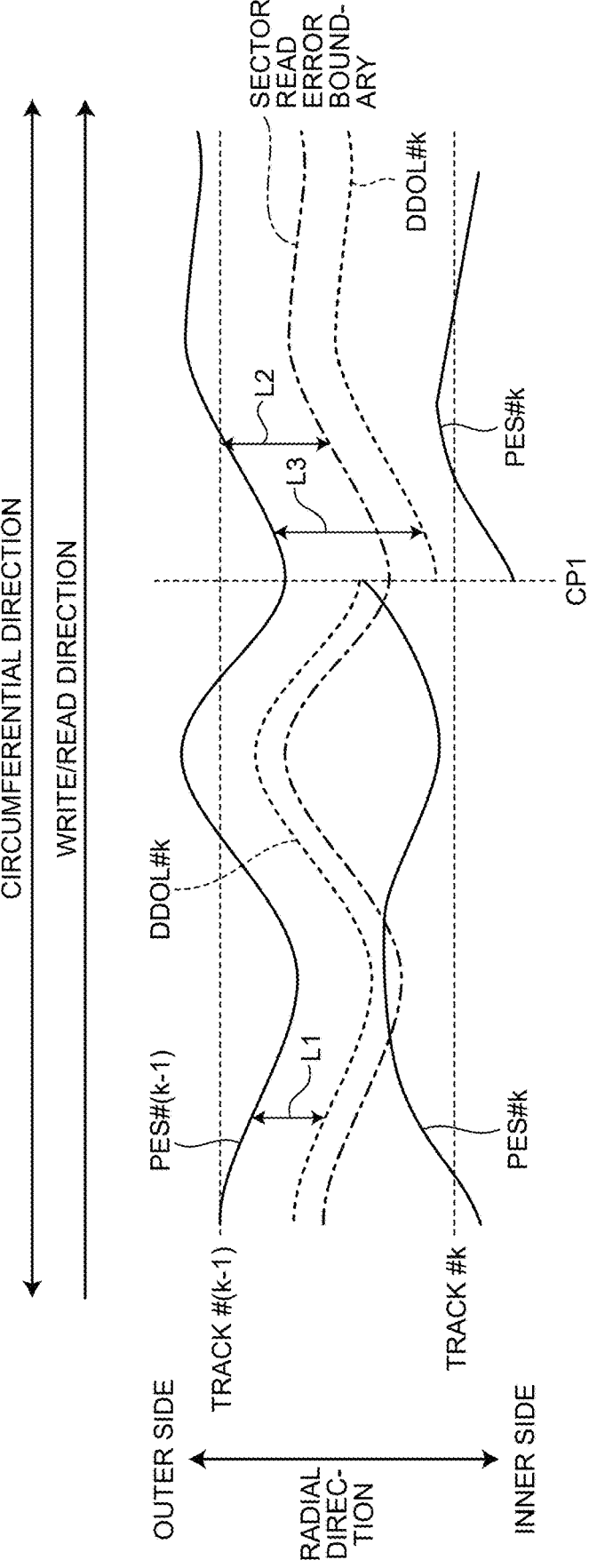
FIG. 7 is another diagram for describing an example of the protection operation of the embodiment.

FIGS. 6 and 7 are diagrams for describing an example of the protection operation of the embodiment. Here, the protection operation in the write operation on the track #k will be described with reference to the track #(k−1) and the track #k in these drawings.

FIG. 6 illustrates a transition of the positional error signal PES #(k−1) in the write operation on the track #(k−1). The positional error signal PES #(k−1) indicates an actual locus of the magnetic head 22 at the time of the write operation on the track #(k−1). That is, the positional error signal PES #(k−1) indicates the write position of the data of the track #(k−1) which is the adjacent track.

In the initial state, the controller 30 sets the dynamic drift off level DDOL #k with the write position of the data of the track #(k−1), namely, the locus indicated by the positional error signal PES #(k−1) as a reference. Specifically, the controller 30 sets the dynamic drift off level DDOL #k at a position offset from the locus indicated by the positional error signal PES #(k−1) toward the track #k by a predetermined fixed length L1.

The dynamic drift off level is a boundary line of the write permission range determined based on the position of the data of the adjacent track.

In addition, the controller 30 sets a sector read error boundary with the locus indicated by the positional error signal PES #(k−1) as a reference. Specifically, the controller 30 sets the sector read error boundary at a position offset from the locus indicated by the positional error signal PES #(k−1) toward the track #k by a predetermined fixed length L2 (where L2>L1).

The sector read error boundary is a boundary at which it is considered that the sector read error does not occur in the adjacent track unless the magnetic head 22 exceeds the sector read error boundary toward the adjacent track during the write operation. That is, the sector read error boundary is a boundary line in the radial direction corresponding to the correction limit of the sector read error.

Occurrence of the track read error in the adjacent track can be estimated by comparing an accumulated damage evaluation amount CDE with a track read error threshold value $Th_{CDE}$. The accumulated damage evaluation amount CDE is an amount obtained by accumulating the damage evaluation amount DE in the section in the circumferential direction in which the write operation is performed. The damage evaluation amount DE is an amount obtained by digitizing damage on the data piece of the data sector DS in the adjacent track, which is caused by the write operation, the damage exceeding a level at which a sector read error occurs. When the accumulated damage evaluation amount CDE is smaller than the track read error threshold value $Th_{CDE}$, it is estimated that no track read error occurs in the adjacent track. When the accumulated damage evaluation amount CDE is larger than the track read error threshold value $Th_{CDE}$, it is estimated that a track read error may occur in the adjacent track.

The sector read error boundary is one of criteria for calculating the damage evaluation amount DE.

When the magnetic head 22 exceeds the dynamic drift off level DDOL toward the adjacent track during the write operation, or when it is estimated that a track read error may occur in the adjacent track, the protection operation is executed.

In the example illustrated in FIG. 6, during the write operation on the track #k, the magnetic head 22 exceeds the dynamic drift off level DDOL toward the adjacent track at the circumferential position CP1. Therefore, the controller 30 executes the protection operation at the circumferential position CP1.

In the example illustrated in FIGS. 6 and 7, the controller 30 performs constriction of the dynamic drift off level DDOL #k as the protection operation. Specifically, the dynamic drift off level DDOL #k from the circumferential position CP1 to the track end is moved toward the track #k.

FIG. 7 illustrates an operation when the dynamic drift off level DDOL #k is constricted. The controller 30 sets the dynamic drift off level DDOL #k after the circumferential position CP1 to a position offset toward the track #k by a fixed length L3 from the locus indicated by the positional error signal PES #(k−1). L3 is longer than L2. As a result, in the section after the circumferential position CP1, the sector read error does not occur in the data sector DS of the adjacent track, and this prevents the data of the adjacent track from being finally unrecoverable.

In the example illustrated in FIG. 7, the controller 30 interrupts the write operation and constricts the dynamic drift off level DDOL #k when the magnetic head 22 passes over the circumferential position CP1. Then, when the magnetic disk 11 makes one rotation and the magnetic head 22 approaches the circumferential position CP1 again, the controller 30 determines whether the position of the magnetic head 22 exceeds the dynamic drift off level DDOL #k after constriction. Since the position of the magnetic head 22 does not exceed the dynamic drift off level DDOL #k after constriction, the controller 30 resumes the write operation from the circumferential position CP1.

Figure 8:
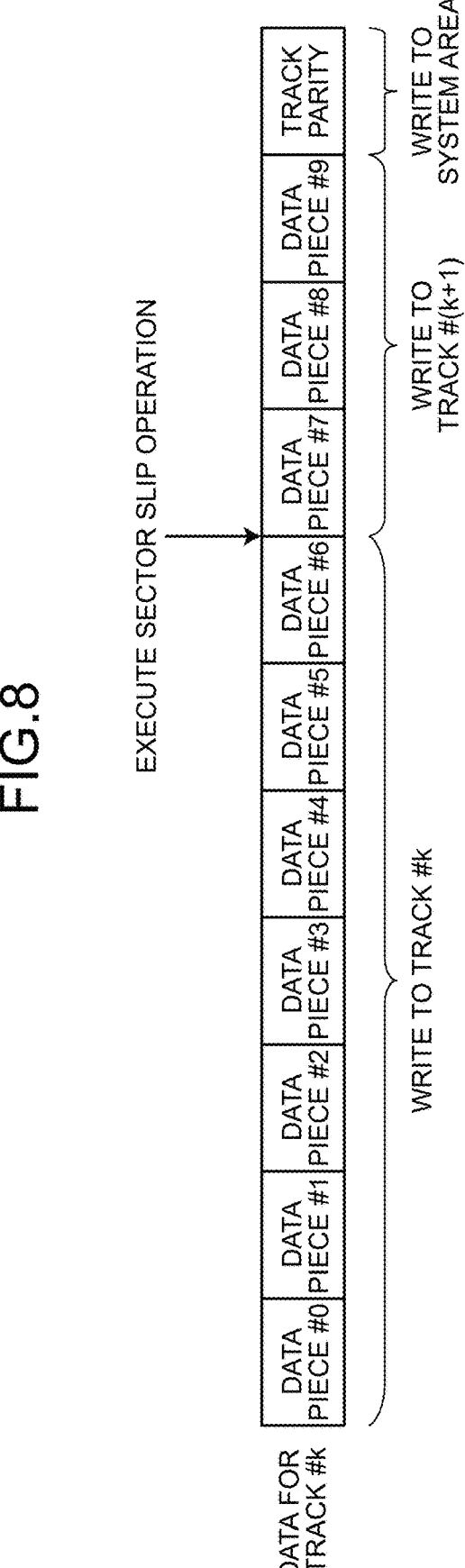
FIG. 8 is a diagram for describing another example of the protection operation of the embodiment.

FIG. 8 is a diagram for describing another example of the protection operation of the embodiment. In the drawing, the data piece #0 to the data piece #9 and a track parity are illustrated as an example of data of one track written to the track #k. The data for one track is referred to as data for the track #k. In the example illustrated in the drawing, a sector slip operation is executed as the protection operation.

It is assumed that the controller 30 regards that the condition for starting the protection operation is satisfied at the timing when writing from the data piece #0 to the data piece #6 of the data for the track #k is completed. The controller 30 ends the write operation on the track #k and executes the sector slip operation.

In the sector slip operation, the controller 30 writes the data piece #7 to the data piece #9, which are data pieces not yet written to the track #k among the data for the track #k, to the track #(k+1). For example, the controller 30 writes the data piece #7 to the data piece #9 in the data sector #0 to the data sector #2 of the track #(k+1). In addition, the track parity of the data for the track #k is written in a system area (not illustrated). The system area is provided at a position different from the band area 130 where the user data is written. The system area may be provided in the magnetic disk 11 or may be provided in a nonvolatile memory such as the FROM 28.

By executing the sector slip operation, the write in the section from the circumferential position where the write operation is ended to the track end in the track #k is refrained. This prevents a track read error from occurring in the adjacent track.

Although a large number of data sectors DS are provided in the magnetic disk 11, quality of these data sectors DS usually varies. The variation in the quality of the data sector DS has various causes such as non-uniformity of a recording face 100 and non-uniformity of the quality of the servo sector SV. Then, a sector error boundary is determined such that a sector data error does not occur even in the data sector DS having the worst quality.

Specifically, controller 30 selects at least one track 41 as a target (target track). In a state where the writing of data to the adjacent track is completed, the controller 30 executes one or more write operations on the target track 41 while varying the squeeze amount for each write operation. The controller 30 executes the read operation on the adjacent track every time the write operation on the target track is completed, and determines whether a sector read error has occurred. The controller 30 obtains the upper limit value of the squeeze amount in which the sector read error does not occur in any data sector DS, and determines the length L2 based on the upper limit value of the squeeze amount.

For example, in a case where the design value of the track pitch is TP and the upper limit value of the squeeze amount at which the sector read error does not occur in any data sector DS is $V_{SQ1}$, the length L2 is determined by the following equation (1).

$$L2 = TP - V_{SQ1} \qquad (1)$$

Figure 9:
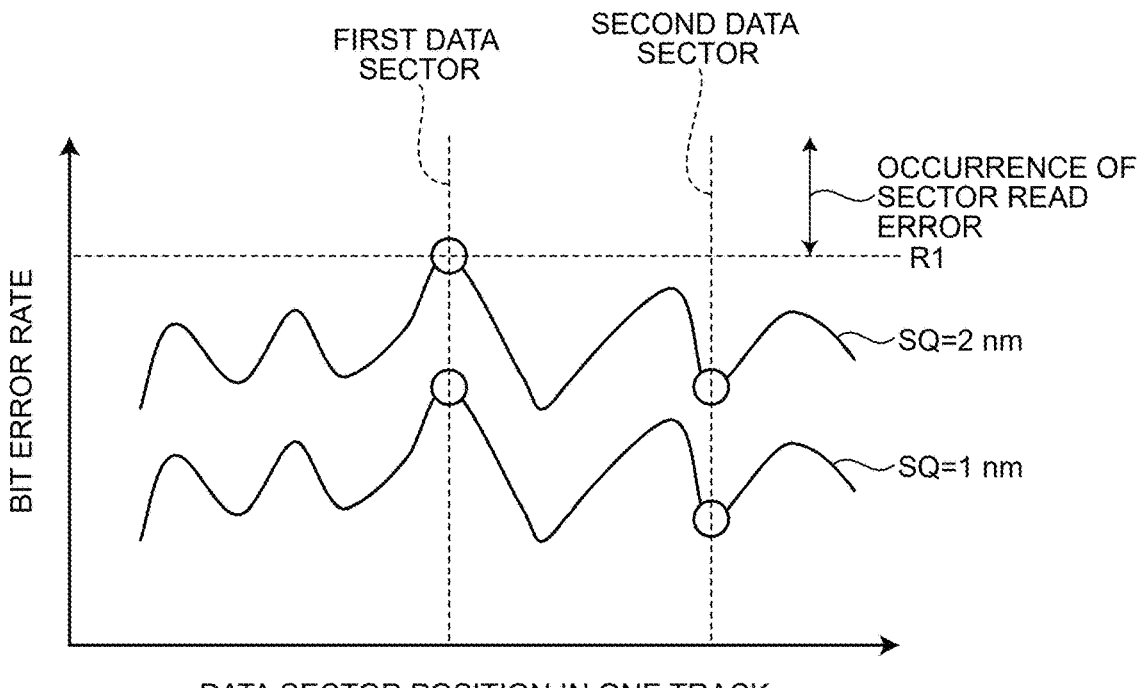
FIG. 9 is a diagram for describing an example of a method of determining a sector read error boundary according to the embodiment.

FIG. 9 is a diagram for describing an example of a method of determining a length L2, namely, a sector read error boundary according to the embodiment. In the drawing, the horizontal axis indicates the position of the data sector DS in the track 41, and the vertical axis indicates the bit error rate obtained by sector error correction when data is read from the data sector DS. R1 is an upper limit bit error rate at which no sector read error occurs.

FIG. 9 illustrates a bit error rate for each data sector DS when the squeeze amount (referred to as SQ) is 1 nm and a bit error rate for each data sector DS when the squeeze amount is 2 nm. In this example, due to the inhomogeneity of the quality of the data sector DS included in the target track, the bit error rate tends to be the highest in the target track in the first data sector, and the bit error rate tends to be the lowest in the target track in the second data sector. Then, as the squeeze amount increases, the bit error rate in each data sector DS increases while maintaining these tendencies.

When the squeeze amount SQ is 2 nm, the first data sector has reached the upper limit R1. Therefore, the length L2 is determined by substituting 2 nm for $V_{SQ1}$ in the equation (1).

Note that the sector read error boundary may be defined by the length L2 or may be defined by the upper limit value $V_{SQ1}$ of the squeeze amount SQ. Here, the upper limit value $V_{SQ1}$ of the squeeze amount SQ is assumed to be a set value that defines a sector read error boundary. In addition, the upper limit value $V_{SQ1}$ of the squeeze amount SQ is referred to as a squeeze amount threshold value $\text{Th}_{SQ}$ in the sense that the upper limit value $V_{SQ1}$ of the squeeze amount SQ is used for determining whether the magnetic head 22 exceeds the sector read error boundary toward the adjacent track by comparison with the squeeze amount SQ.

The method of determining the squeeze amount threshold value $\text{Th}_{SQ}$ (the upper limit value $V_{SQ1}$ of the squeeze amount SQ) is not limited to the above method. The squeeze amount threshold value $\text{Th}_{SQ}$ may be determined in any manner as long as it can correspond to or be considered to correspond to the correction limit of the sector read error.

The squeeze amount threshold value $\text{Th}_{SQ}$ is determined in a manufacturing process and stored in a nonvolatile storage area (for example, the FROM 28 or the magnetic disk 11) in the magnetic disk apparatus 1.

The squeeze amount threshold value $\text{Th}_{SQ}$ may be individually set for each of the tracks 41, or may be individually set for each of the tracks 41 disposed continuously in the radial direction.

The recording face 100 may be divided into multiple zones in the radial direction, and the recording density may be individually set for each zone. In such a case, the squeeze amount threshold value $\text{Th}_{SQ}$ may be individually set for each zone.

A technique compared with that of the embodiment will be described. A technique compared with that of the embodiment is referred to as a comparative example. In the comparative example, the controller acquires an amount by which the squeeze amount SQ exceeds the squeeze amount threshold value $\text{Th}_{SQ}$ as the damage evaluation amount DE. That is, the controller sets the damage evaluation amount DE to 0 when the squeeze amount SQ does not exceed the squeeze amount threshold value $\text{Th}_{SQ}$, and acquires a value obtained by subtracting the squeeze amount threshold value $\text{Th}_{SQ}$ from the squeeze amount SQ as the damage evaluation amount DE when the squeeze amount SQ exceeds the squeeze amount threshold value $\text{Th}_{SQ}$. The controller accumulates the damage evaluation amount DE in a section in which the write operation in the track is completed, and uses an amount obtained by the accumulation as the accumulated damage evaluation amount CDE.

According to the comparative example, it is possible to prevent a track read error from occurring in an adjacent track. However, there is room for reducing the frequency of execution of the protection operation.

The squeeze amount threshold value $\text{Th}_{SQ}$ is set based on the data sector DS having the worst quality. Therefore, in consideration of the variation in the quality of the data sector DS in the track 41, the accumulated damage evaluation amount CDE obtained by the comparative example can be considered as excessively evaluating the damage on the data of the adjacent track.

For example, in the first data sector DS illustrated in FIG. 9, when the squeeze amount SQ exceeds 2 nm, the damage evaluation amount DE becomes larger than 0. However, the second data sector DS has high quality. Therefore, even if the squeeze amount SQ in the second data sector DS slightly exceeds 2 nm, the data piece is not damaged at a level at which a sector read error occurs or more. In other words, in the calculation method of obtaining the damage evaluation amount DE by subtracting the squeeze amount threshold value $\text{Th}_{SQ}$ from the squeeze amount SQ, the damage of the data piece of the second data sector DS is overestimated.

According to the present embodiment, the controller 30 acquires a metric (referred to as a signal quality metric) representing the signal quality of the data of the adjacent track for each data sector DS by performing a read operation on the adjacent track. Then, the controller 30 converts the signal quality metric into the damage evaluation amount DE. The controller 30 acquires the accumulated damage evaluation amount CDE by accumulating the damage evaluation amount DE obtained by conversion.

The signal quality metric obtained by reading the data of the adjacent track directly corresponds to the damage on the data regardless of the variation in the quality of the data sector DS. Therefore, as compared with the comparative example in which the damage on the data of the adjacent track is overestimated, the frequency at which the track read error is estimated to occur in the adjacent track is reduced, and the frequency of execution of the protection operation is reduced.

When the protection operation is frequently executed, the performance of the write operation is deteriorated. For example, in a case where constriction of the dynamic drift off level DDOL is performed as the protection operation, the frequency at which the write operation is interrupted increases by narrowing the write permission range, and as a result, the speed (rate) of writing data to the magnetic disk 11 decreases. In a case where the sector slip operation is performed as the protection operation, data pieces are not written in some data sectors DS at the end of the track 41 on which the sector slip operation has been performed. Therefore, when the sector slip operation is frequently executed, there is a possibility that the capacity of one band area becomes insufficient.

Thus, according to the comparative example, when the frequency of execution of the protection operation increases, the performance of the write operation decreases.

According to the embodiment, since the frequency of execution of the protection operation is reduced, the performance of the write operation is improved as compared with the comparative example.

Note that the signal quality metric of the data of the adjacent track is obtained by the read operation on the adjacent track. Therefore, during execution of the write operation, the signal quality metric of the adjacent track cannot be acquired. During execution of the write operation, similarly to the comparative example, the controller 30 acquires an amount by which the squeeze amount SQ exceeds the squeeze amount threshold value $\text{Th}_{SQ}$ as the damage evaluation amount DE. That is, the controller 30 assumes that the damage evaluation amount DE is 0 when the squeeze amount SQ does not exceed the squeeze amount threshold value $\text{Th}_{SQ}$, and acquires a value obtained by subtracting the squeeze amount threshold value $\text{Th}_{SQ}$ from the squeeze amount SQ as the damage evaluation amount DE when the squeeze amount SQ exceeds the squeeze amount threshold value $\text{Th}_{SQ}$. A method of acquiring an amount by which the squeeze amount SQ exceeds the squeeze amount threshold value $\text{Th}_{SQ}$ as the damage evaluation amount DE is referred to as a first calculation method. When the accumulated damage evaluation amount CDE obtained by using the first calculation method becomes larger than the track read error threshold value $\text{Th}_{CDE}$, the controller 30 executes the read operation on the adjacent track and acquires the signal quality metric of the data of the adjacent track. Then, the controller 30 acquires the damage evaluation amount DE based on the signal quality metric. A method of acquiring the damage evaluation amount DE based on the signal quality metric is referred to as a second calculation method. When the accumulated damage evaluation amount CDE obtained by using the second calculation method becomes larger than the track read error threshold value $Th_{CDE}$, the controller 30 executes the protection operation.

For the signal quality metric, a bit error rate, a Viterbi internal operation margin, or an FIR filter waveform equalization error can be used. The RWC 25 can output the bit error rate, the Viterbi internal operation margin, and the FIR filter waveform equalization error for each data sector DS during the read operation. The controller 30 can use one of the pieces of information output from the RWC 25 as the signal quality metric. Note that the signal quality metric is not limited thereto as long as it is a numerical value representing the signal quality of the read data piece.

The controller 30 executes conversion from the signal quality metric to the damage evaluation amount DE based on correspondence information 200.

Figure 10:
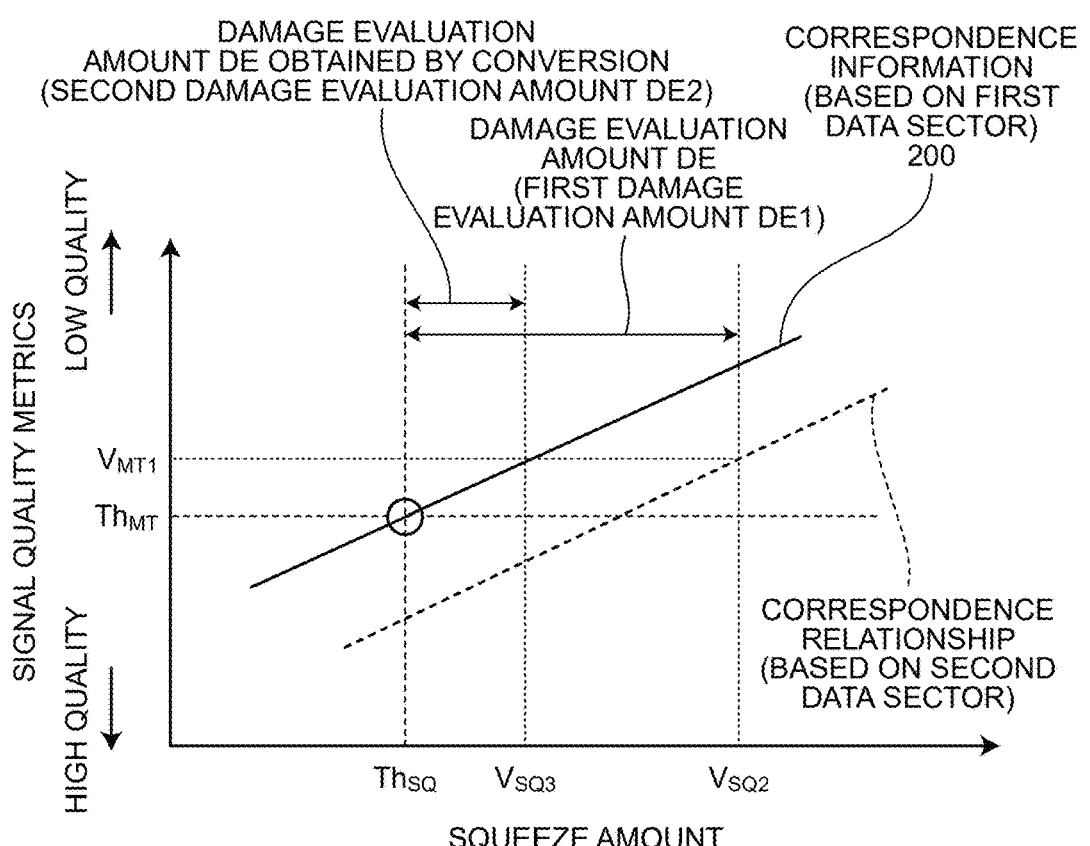
FIG. 10 is a diagram for describing an example of a configuration of correspondence information according to the embodiment and a second calculation method using the correspondence information.

FIG. 10 is a diagram for describing an example of the configuration of the correspondence information 200 according to the embodiment and the second calculation method using the correspondence information 200.

The correspondence information 200 indicates a correspondence relationship between the squeeze amount SQ and the signal quality metric for the data sector DS of a predetermined quality. In the example illustrated in FIG. 10, information in which a correspondence relationship between the squeeze amount SQ and the signal quality metric for the first data sector DS is recorded is used as the correspondence information 200. Note that the correspondence information 200 may record a correspondence relationship between the squeeze amount SQ and the signal quality metric for the data sector DS selected by an any method without being limited to the first data sector DS.

In addition, in FIG. 10, the correspondence relationship between the squeeze amount SQ and the signal quality metric for the second data sector is indicated by a dotted line. When the squeeze amount of the second data sector obtained based on the positional error signal PES is $V_{SQ2}$ and $V_{SQ2}$ is larger than the squeeze amount threshold value $Th_{SQ}$, in the first calculation method, the damage evaluation amount DE of the second data sector is $(V_{SQ2}-Th_{SQ})$.

It is assumed that the signal quality metric of the data piece of the second data sector is $V_{MT1}$ by the read operation on the second data sector. In the second calculation method, the controller 30 converts the value $V_{MT1}$ of the signal quality metric into the value of the corresponding squeeze amount SQ by referring to the correspondence information 200. It is assumed that the value of the squeeze amount SQ corresponding to the value $V_{MT1}$ of the signal quality metric is $V_{SQ3}$ and $V_{SQ3}$ is larger than the squeeze amount threshold value $Th_{SQ}$. In this case, the controller 30 sets $(V_{SQ3}-Th_{SQ})$ as the damage evaluation amount DE. That is, in the second calculation method, the value $V_{MT1}$ of the signal quality metric is converted into the value $(V_{SQ3}-Th_{SQ})$ of the damage evaluation amount DE.

Hereinafter, the damage evaluation amount DE obtained by the first calculation method is referred to as a first damage evaluation amount DE1. The damage evaluation amount DE obtained by the second calculation method is referred to as a second damage evaluation amount DE2.

In addition, the squeeze amount acquired based on the positional error signal PES such as $V_{SQ2}$ described above is referred to as a first squeeze amount SQ1. Moreover, the squeeze amount SQ obtained by conversion of the signal quality metric using the correspondence information 200, such as $V_{SQ3}$ described above, is referred to as a second squeeze amount SQ2.

The correspondence information 200 is determined in the manufacturing process and stored in a nonvolatile storage area (for example, the FROM 28 or the magnetic disk 11) in the magnetic disk apparatus 1.

Figure 11:
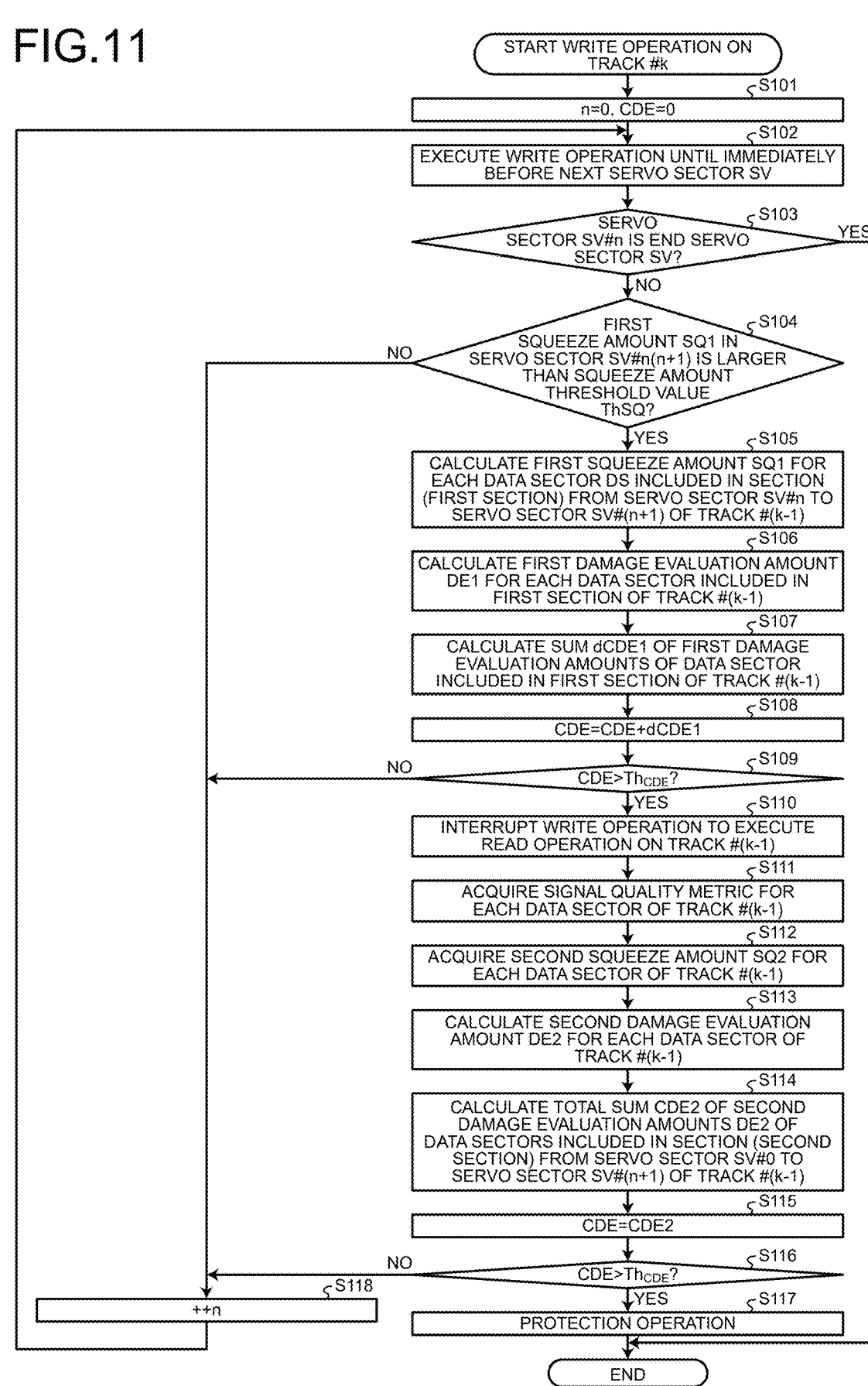
FIG. 11 is a flowchart illustrating an example of an operation related to the operation of a magnetic disk apparatus 1 of the embodiment.

FIG. 11 is a flowchart illustrating an example of an operation related to the operation of the magnetic disk apparatus 1 of the embodiment. This figure illustrates a series of processes of the write operation on the track #k.

First, the controller 30 initializes a variable n and a variable CDE to 0 (S101). The variable n is a variable in which the ID of the servo sector SV is stored. The variable CDE is a variable in which the calculated value of the accumulated damage evaluation amount CDE is stored.

Subsequently, the controller 30 executes the write operation for the section from immediately after the servo sector SV #n to immediately before the servo sector SV next to the servo sector SV #n (S102). At this time, the controller 30 reads the servo information from the servo sector SV subsequent to the servo sector SV #n and acquires the PES based on the read servo information.

The controller 30 determines whether the servo sector SV #n is the end servo sector SV (S103). For example, according to the configuration of the track 41 illustrated in FIG. 5, the servo sector SV #7 is the end servo sector SV.

When the servo sector SV #n is the end servo sector SV (S103: Yes), the write operation on the track #k is completed.

When the servo sector SV #n is not the end servo sector SV (S103: No), the controller 30 determines whether the squeeze amount SQ1 in the servo sector SV #n(n+1) is larger than the squeeze amount threshold value $Th_{SQ}$ (S104).

In S104, the controller 30 acquires the first squeeze amount SQ1 in the servo sector SV #n(n+1) by calculating a difference between the positional error signal PES #(k−1), which is the positional error signal PES of the adjacent track, and the positional error signal PES #k. Alternatively, the controller 30 may simply acquire, as the first squeeze amount SQ1, a deviation amount toward the adjacent track out of the deviation amount of the magnetic head 22 from the track center of the track #k indicated by the positional error signal PES #k.

When the first squeeze amount SQ1 in the servo sector SV #n(n+1) is larger than the squeeze amount threshold value $Th_{SQ}$ (S104: Yes), the controller 30 calculates the first squeeze amount SQ1 for each data sector DS included in a section from the servo sector SV #n to the servo sector SV #(n+1) of the track #(k−1) (S105). A section from the servo sector SV #n to the servo sector SV #(n+1) is referred to as a first section.

As described above, the positional error signal PES is acquired every time the magnetic head 22 passes over the servo sector SV. Therefore, the first squeeze amount SQ1 in each servo sector SV can be directly calculated based on the positional error signal PES. The controller 30 estimates the first squeeze amount SQ1 for each data sector DS of the adjacent track based on the first squeeze amount SQ1 in each servo sector SV.

In one example, the controller 30 calculates the first squeeze amount SQ1 for each data sector DS of the adjacent track by interpolation between the first squeeze amounts SQ1 in respective servo sectors SV. The positional relationship between each servo sector SV and each data sector DS of the adjacent track is known. The controller 30 calculates the first squeeze amount SQ1 for each data sector DS of the adjacent track by linear interpolation between the first squeeze amounts SQ1 in respective servo sectors SV using the positional relationship. That is, in S105, the controller 30 acquires the first squeeze amount SQ1 for each data sector DS included in the first section by linear interpolation between the first squeeze amount SQ1 in the servo sector SV #n and the first squeeze amount SQ1 in the servo sector SV #(n+1). The interpolation method is not limited to linear interpolation. The controller 30 may perform interpolation by approximation with a polynomial having a second or higher degree.

In another example, the controller 30 regards that the first squeeze amounts SQ1 of all the data sectors DS between two servo sectors SV adjacent in the circumferential direction are equal to a larger value of the first squeeze amounts SQ1 in the two servo sectors SV. That is, in S105, the controller 30 regards a larger value of the first squeeze amount SQ1 in the servo sector SV #n and the first squeeze amount SQ1 in the servo sector SV #(n+1) as the first squeeze amounts SQ1 of all the data sectors DS included in the first section of the track #(k−1).

Note that the method of calculating the first squeeze amount SQ1 for each data sector DS of the adjacent track is not limited to the above-described method.

Subsequent to S105, the controller 30 calculates the first damage evaluation amount DE1 for each data sector DS included in the first section of the track #(k−1) (S106).

In S106, the controller 30 performs the following processing for each data sector DS included in the first section of the track #(k−1). That is, the controller 30 first subtracts the squeeze amount threshold value $Th_{SQ}$ from the first squeeze amount SQ1. When the value $(SQ1-Th_{SQ})$ is 0 or less, the controller 30 sets the first damage evaluation amount DE1 is 0. When the value $(SQ1-Th_{SQ})$ is larger than 0, the controller 30 sets the value $(SQ1-Th_{SQ})$ to the first damage evaluation amount DE1.

The controller 30 calculates a sum (referred to as dCDE1) of the first damage evaluation amounts DE1 of the data sectors DS included in the first section of the track #(k−1) (S107). Then, the controller 30 adds dCDE1 to the value of the variable CDE and updates the value of the variable CDE with the value obtained by the addition (S108).

The variable CDE indicates the accumulated damage evaluation amount CDE. The controller 30 determines whether the value of the variable CDE, namely, the accumulated damage evaluation amount CDE is larger than the track read error threshold value $Th_{CDE}$ (S109).

When the value of the variable CDE is larger than the track read error threshold value $Th_{CDE}$ (S109: Yes), the controller 30 interrupts the write operation on the track #k and executes the read operation on the track #(k−1) (S110).

In the read operation on the track #(k−1), the RWC 25 outputs the signal quality metric for each data sector DS of the track #(k−1). The controller 30 acquires the signal quality metric output for each data sector DS of the track #(k−1) (S111).

The controller 30 acquires the second squeeze amount SQ2 for each data sector DS of the track #(k−1) based on the signal quality metric for each data sector DS of the track #(k−1) and the correspondence information 200 (S112). Then, the controller 30 calculates the second damage evaluation amount DE2 for each data sector of the track #(k−1) (S113).

In S113, the controller 30 calculates the second damage evaluation amount DE2 in the manner same as in S106. However, the controller 30 uses the second squeeze amount SQ2 instead of the first squeeze amount SQ1.

The controller 30 calculates the sum (referred to as CDE2) of the second damage evaluation amounts DE2 of the data sectors DS included in the section from the servo sector SV #0 to the servo sector SV #(n+1) of the track #(k−1) (S114). Then, the controller 30 updates the variable CDE with the obtained sum value CDE2 (S115). Note that a section from the servo sector SV #0 to the servo sector SV #(n+1) of the track #(k−1) is referred to as a second section.

The controller 30 determines whether the value of the variable CDE, namely, the accumulated damage evaluation amount CDE is larger than the track read error threshold value $Th_{CDE}$ (S116).

When the value of the variable CDE is larger than the track read error threshold value $Th_{CDE}$ (S116: Yes), the controller 30 executes the protection operation (S117), and the series of operations ends.

When the value of the variable CDE is not larger than the track read error threshold value $Th_{CDE}$ (S116: No), the controller 30 increments the value of the variable n by one (S118), and the control transits to S102.

In this manner, the controller 30 calculates the accumulated damage evaluation amount CDE based on the first calculation method (S105 to S108). When the accumulated damage evaluation amount CDE based on the first calculation method is larger than a track error threshold value $Th_{CDE}$ (S109: Yes), the controller 30 updates the accumulated damage evaluation amount CDE based on the second calculation method instead of executing the protection operation immediately (S110 to S115). When the accumulated damage evaluation amount CDE based on the second calculation method is not larger than the track error threshold value $Th_{CDE}$ (S116: No), the controller 30 continues the write operation without performing the protection operation (S118, S102). When the accumulated damage evaluation amount CDE based on the second calculation method is larger than the track error threshold value $Th_{CDE}$ (S116: Yes), the controller 30 executes the protection operation (S117).

In the example illustrated in FIG. 11, when the squeeze amount SQ1 in the servo sector SV #n(n+1) is equal to the squeeze amount threshold value $Th_{SQ}$ in S104, the control transits to S118. When the squeeze amount SQ1 in the servo sector SV #n(n+1) is equal to the squeeze amount threshold value $Th_{SQ}$, the control may transition to S105 as in the case where the squeeze amount SQ1 in the servo sector SV #n(n+1) is larger than the squeeze amount threshold value $Th_{SQ}$.

When the value of the variable CDE is equal to the track read error threshold value $Th_{CDE}$ in S109, the control transits to S118. When the value of the variable CDE is equal to the track read error threshold value $Th_{CDE}$, the control may transition to S110 as in the case where the value of the variable CDE is larger than the track read error threshold value $Th_{CDE}$.

When the value of the variable CDE is equal to the track read error threshold value $Th_{CDE}$ in S116, the control transits to S118. When the value of the variable CDE is equal to the track read error threshold value $Th_{CDE}$, the control may transition to S117 as in the case where the value of the variable CDE is larger than the track read error threshold value $Th_{CDE}$.

Note that, in the series of operations illustrated in FIG. 11, the operations of S105 to S109 are an example of a first operation. The operations of S110 to S116 are an example of a second operation. In addition, in S101 to S116, the servo sector SV #(n+1) is an example of a first servo sector and a second servo sector. Track #k is an example of a first track. Track #(n−1) is an example of a second track. The value of the variable CDE obtained by the calculation in S108 is an example of a first amount. The value of the variable CDE obtained by the calculation in S115 is an example of a second amount. The track error threshold value $Th_{CDE}$ is an example of the first threshold value. The first squeeze amount SQ1 is an example of a third amount and a fifth amount. The squeeze amount threshold value $Th_{SQ}$ is an example of a second threshold value. The second squeeze amount SQ2 is an example of a fourth amount.

Figure 12:
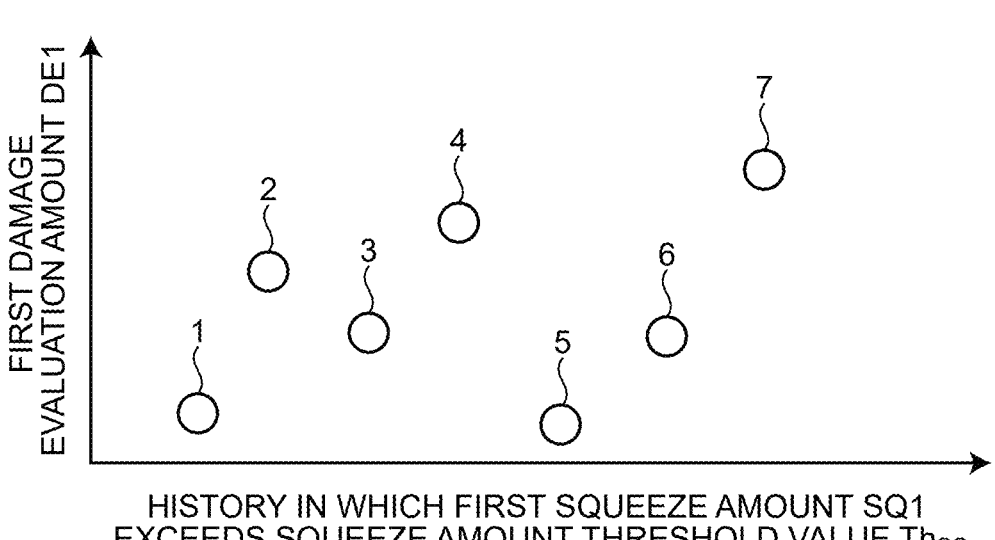
FIG. 12 is a diagram illustrating an example of a history in which the first squeeze amount exceeds a squeeze amount threshold value.

FIG. 12 is a diagram illustrating an example of a history in which the first squeeze amount SQ1 exceeds the squeeze amount threshold value $Th_{SQ}$ when the process of S106 illustrated in FIG. 11 is performed. Note that the vertical axis represents the first damage evaluation amount DE1 of the data sector DS in which the first squeeze amount SQ1 exceeds the squeeze amount threshold value $Th_{SQ}$.

In the example illustrated in FIG. 12, the first squeeze amount SQ1 exceeds the squeeze amount threshold value $Th_{SQ}$ in the seven data sectors DS. Since the first damage evaluation amounts DE1 of data sectors DS other than the seven data sectors DS are 0, the sum of the first damage evaluation amounts DE1 of the seven data sectors DS is acquired as the accumulated damage evaluation amount CDE.

When the accumulated damage evaluation amount CDE exceeds the track error threshold value $Th_{CDE}$, the controller 30 calculates the second damage evaluation amount DE2 based on the second calculation method (see S113 in FIG. 11).

Figure 13:
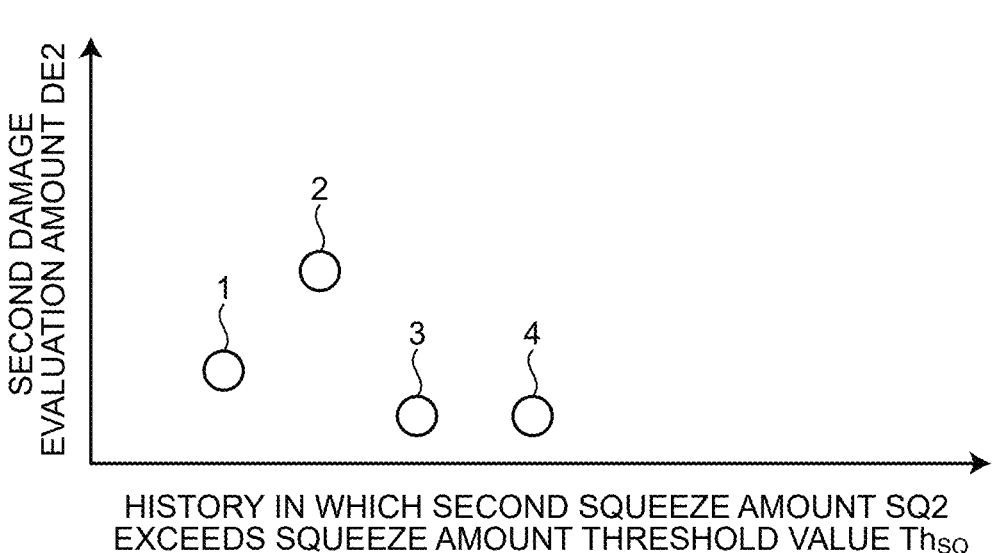
FIG. 13 is a diagram illustrating an example of a history in which the second squeeze amount exceeds a squeeze amount threshold value.

FIG. 13 is a diagram illustrating an example of a history in which the second squeeze amount SQ2 exceeds the squeeze amount threshold value $Th_{SQ}$ when the process of S113 illustrated in FIG. 11 is performed. The vertical axis indicates the second damage evaluation amount DE2 of the data sector DS in which the second squeeze amount SQ2 exceeds the squeeze amount threshold value $Th_{SQ}$.

In the example illustrated in FIG. 13, the number of data sectors DS in which the second squeeze amount SQ2 exceeds the squeeze amount threshold value $Th_{SQ}$ is four, which is smaller than seven, which is the number of data sectors DS in which the first squeeze amount SQ1 exceeds the squeeze amount threshold value $Th_{SQ}$. The sum of the second damage evaluation amounts DE2 of the four data sectors DS is acquired as the accumulated damage evaluation amount CDE based on the second calculation. When the accumulated damage evaluation amount CDE acquired based on the second squeeze amount SQ2 is smaller than the track error threshold value $Th_{CDE}$, the controller 30 continues the write operation.

Figure 14:
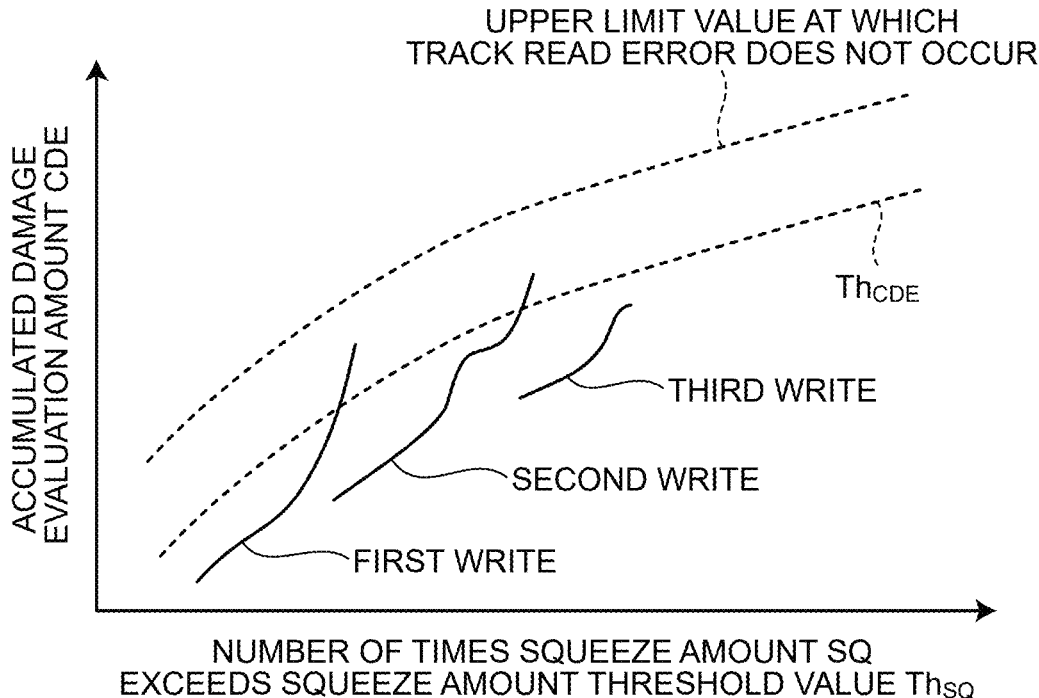
FIG. 14 is a diagram illustrating an example of transition of the accumulated damage evaluation amount according to the embodiment.

FIG. 14 is a diagram illustrating an example of transition of the accumulated damage evaluation amount CDE according to the embodiment. The horizontal axis indicates the number of times the squeeze amount SQ exceeds the squeeze amount threshold value $Th_{SQ}$ in the write operation on a certain track 41. The vertical axis indicates the accumulated damage evaluation amount CDE.

In the example illustrated in FIG. 14, the interruption of the write operation according to the affirmative determination in S109 of FIG. 11 and the resumption of the write operation according to the negative determination in S116 each occur twice. The write operation until the initial interruption of the write operation is referred to as a first write, the write operation from the initial resumption of the write operation to the second interruption of the write operation is referred to as a second write, and the write operation after the second resumption of the write operation is referred to as a third write.

FIG. 14 illustrates an upper limit value of the accumulated damage evaluation amount CDE in which the track read error does not occur. It can be seen from this figure that a value having a certain margin up to the upper limit value of the accumulated damage evaluation amount CDE at which the track read error does not occur is set as the track read error threshold value $Th_{CDE}$.

In the first write, the accumulated damage evaluation amount CDE is calculated based on the first calculation method. Then, the accumulated damage evaluation amount CDE based on the second calculation method is calculated in response to the accumulated damage evaluation amount CDE exceeding the track read error threshold value $Th_{CDE}$ in the first write.

According to the accumulated damage evaluation amount CDE based on the second calculation method, the number of times the squeeze amount SQ exceeds the squeeze amount threshold value $Th_{SQ}$ and the accumulated damage evaluation amount CDE can decrease. In the example illustrated in FIG. 14, at the start time point of the second write, the number of times the squeeze amount SQ exceeds the squeeze amount threshold value $Th_{SQ}$ is reduced, compared with that at the end time point of the first write, and the accumulated damage evaluation amount CDE is also reduced.

In the second write, the damage evaluation amount CD in a section (for example, in the flowchart illustrated in FIG. 11, the first section when steps S110 to S115 are performed after steps S105 to S108 are performed) in which the write is newly performed the section being calculated based on the first calculation method is accumulated in the accumulated damage evaluation amount CDE in a section (for example, the second section described with reference to FIG. 11) in which the first write is completed, the section being calculated based on the second calculation method. As the accumulated damage evaluation amount CDE exceeds the track read error threshold value $Th_{CDE}$ in the second write, the accumulated damage evaluation amount CDE based on the second calculation method in the section in which the first write and the second write are completed is calculated.

In the example illustrated in FIG. 14, the accumulated damage evaluation amount CDE based on the second calculation method in the section in which the first write and the second write are completed is not larger than the track read error threshold value $Th_{CDE}$, and the third write is started.

According to the comparative example, the protection operation is executed based on the comparison between the accumulated damage evaluation amount CDE calculated by the first calculation method and the track read error threshold value $Th_{CDE}$. Therefore, according to the comparative example, the protection operation is executed when the first write ends.

In contrast, according to the embodiment, the accumulated damage evaluation amount CDE is recalculated by the second calculation method. In contrast to the first calculation method in which the damage on the data piece is overestimated in the high-quality data sector DS, the second calculation method can appropriately evaluate the damage on the data piece regardless of the quality of the data sector DS. Therefore, even if the accumulated damage evaluation amount CDE calculated by the first calculation method exceeds the track read error threshold value $Th_{CDE}$, the write operation is continued without performing the protection operation as long as the accumulated damage evaluation amount CDE calculated by the second calculation method is smaller than the track read error threshold value $Th_{CDE}$.

Note that, in the example described above, the damage on the data of the adjacent track is represented by an amount obtained by accumulating the damage evaluation amount DE of the damage on the data piece of the data sector DS of the adjacent track. The amount representing the damage on the data of the adjacent track is not limited thereto.

For example, the controller 30 may use, as the amount representing the damage on the data of the adjacent track, an amount obtained by dividing the damage evaluation amount DE of the data piece of the data sector DS of the adjacent track by the number of data sectors DS in which the squeeze amount SQ (the first squeeze amount SQ1 or the second squeeze amount SQ2) exceeds the squeeze amount threshold value $Th_{SQ}$, namely, an average value of the damage evaluation amounts DE. The average value of the damage evaluation amounts DE is referred to as an average damage evaluation amount ADE.

Figure 15:
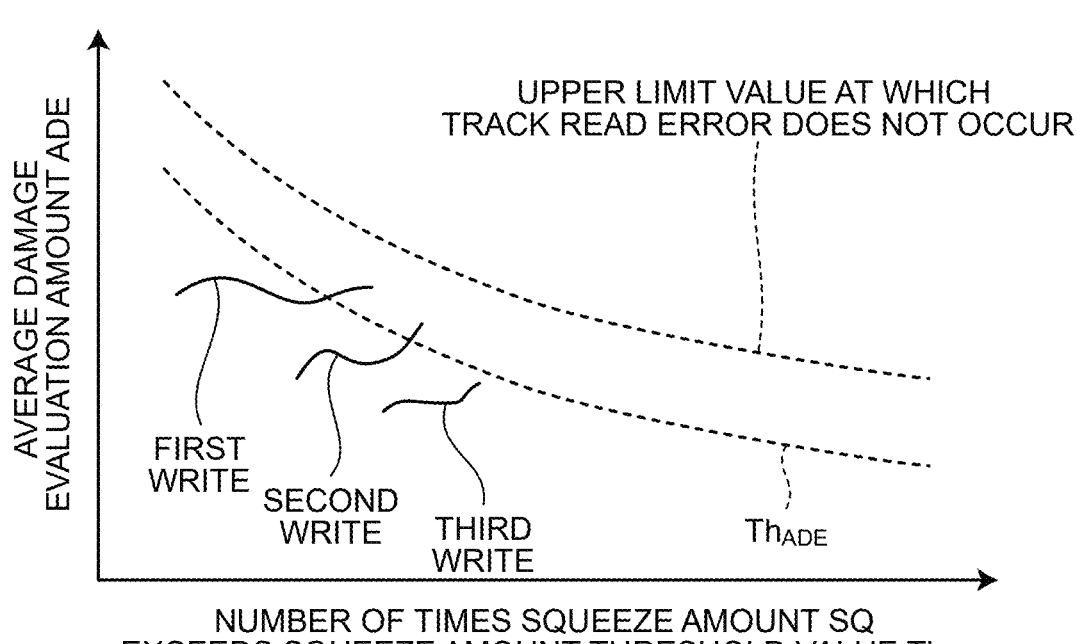
FIG. 15 is a diagram illustrating an example of transition of the average damage evaluation amount according to the embodiment.

FIG. 15 is a diagram illustrating an example of transition of the average damage evaluation amount ADE according to the embodiment. The horizontal axis indicates the number of times the squeeze amount SQ exceeds the squeeze amount threshold value $Th_{SQ}$ in the write operation on a certain track 41. The vertical axis represents the average damage evaluation amount ADE.

FIG. 15 illustrates an upper limit value of the average damage evaluation amount ADE at which the track read error does not occur. A value having a certain margin up to the upper limit value of the average damage evaluation amount ADE at which no track read error occurs is set as the track read error threshold value $Th_{ADE}$.

When the average damage evaluation amount ADE obtained based on the first calculation method is larger than the track read error threshold value $Th_{ADE}$, the controller 30 interrupts the write operation and recalculates the average damage evaluation amount ADE based on the second calculation method. When the average damage evaluation amount ADE obtained based on the recalculation based on the second calculation method is not larger than the track read error threshold value $Th_{ADE}$, the controller 30 continues the write operation without performing the protection operation. When the average damage evaluation amount ADE obtained based on the second calculation method is larger than the track error threshold value $Th_{ADE}$, the controller 30 executes the protection operation.

As described above, the damage on the data of the adjacent track can be expressed by various statistical amounts such as an amount obtained by accumulating the damage evaluation amounts DE of the data pieces of the data sectors DS of the adjacent track and an amount obtained by averaging the damage evaluation amounts DE of the data pieces of the data sectors DS of the adjacent track.

In the above description, the controller 30 accumulates the damage evaluation amount DE (the first damage evaluation amount DE1 and the second damage evaluation amount DE2) acquired by calculation for each data sector DS of the adjacent track in the section (that is, the second section) in which the writing is executed, thereby acquiring the accumulated damage evaluation amount CDE that is the evaluation amount of the damage on the data of the adjacent track. The unit of accumulation is not limited to the units of data sectors DS of the adjacent track.

In the first calculation, the controller 30 may simply calculate the damage evaluation amount in units of servo sectors SV based on the squeeze amount in each servo sector SV and calculate the damage evaluation amount obtained in units of servo sectors SV.

Alternatively, in the first calculation, the controller 30 may simply acquire the squeeze amount at the position of each data sector DS included in the write target track 41 by interpolation based on the squeeze amount in each servo sector SV, and calculate the damage evaluation amount based on the acquired squeeze amount.

As described above, according to the embodiment, the controller 30 executes the first operation (see, for example, S105 to S109 in FIG. 11) in response to passing over the servo sector SV during the write operation. The first operation includes an operation of calculating the evaluation amount of the damage on the data of the adjacent track caused by the write operation, based on the positional error signal PES (for example, see S105 to S108 in FIG. 11), and comparing the accumulated damage evaluation amount CDE calculated based on the positional error signal PES with the track error threshold value $Th_{CDE}$ (for example, see S109 in FIG. 11). The controller 30 interrupts the write operation in response to determining that the accumulated damage evaluation amount CDE is larger than the track error threshold value $Th_{CDE}$ in the first operation (see, for example, S110 in FIG. 11) and executes the second operation (see, for example, S110 to S116 in FIG. 11). The second operation includes an operation of executing the read operation on the adjacent track (see, for example, S110 in FIG. 11), acquiring a signal quality metric that is a metric representing the signal quality of the data of the adjacent track read by the read operation (see, for example, S111 in FIG. 11), calculating the accumulated damage evaluation amount CDE based on the signal quality metric (see, for example, S112 to S115), and comparing the accumulated damage evaluation amount CDE calculated based on the signal quality metric with the track error threshold value $Th_{CDE}$ (for example, see S116 in FIG. 11). The controller 30 continues the write operation in response to determining that the accumulated damage evaluation amount CDE is smaller than the track error threshold value $Th_{CDE}$ in the first operation (for example, see a negative determination in S109 in FIG. 11) or determining that the accumulated damage evaluation amount CDE is smaller than the track error threshold value $Th_{CDE}$ in the second operation (for example, see negative determination in S116 in FIG. 11). The controller 30 executes the protection operation in response to determining that the accumulated damage evaluation amount CDE is larger than the track error threshold value $Th_{CDE}$ in the second operation (for example, see affirmative determination in S116 of FIG. 11).

Therefore, since the frequency of execution of the protection operation is reduced, the performance of the write operation is improved as compared with that in the comparative example.

In addition, according to the embodiment, a data piece on which error correction for sector error correction has been performed is written in each data sector DS. In the first operation, the controller 30 acquires the first squeeze amount SQ1 for each data sector DS of the adjacent track (see, for example, S105 in FIG. 11), calculates a first damage evaluation amount DE1 which is an amount by which the first squeeze amount SQ1 exceeds a squeeze amount threshold value $Th_{SQ}$ which is a threshold value corresponding to a correction limit of sector error correction (see, for example, S106 in FIG. 11), and acquires the accumulated damage evaluation amount CDE by accumulating or averaging the first damage evaluation amounts DE1 (See, for example, S107 and S108 in FIG. 11.).

Therefore, it is possible to evaluate the damage on the data of the adjacent track based on the damage on the data sector DS of the adjacent track, the damage exceeding the level at which the sector read error of the data piece occurs.

Moreover, according to the embodiment, in the second operation, the controller 30 acquires the signal quality metric for each data sector DS of the adjacent track (see, for example, S111 in FIG. 11), converts the signal quality metric into the second squeeze amount SQ2 based on the correspondence information 200 (see, for example, S112 in FIGS. 10 and 11), calculates the second damage evaluation amount DE2 which is an amount by which the second squeeze amount SQ2 exceeds the squeeze amount threshold value $Th_{SQ}$ which is a threshold value corresponding to the correction limit of the sector error correction (see, for example, S113 in FIG. 11), and acquires the accumulated damage evaluation amount CDE by accumulating or averaging the second damage evaluation amounts DE2 (See, for example, S114 and S115 in FIG. 11).

Therefore, it is possible to evaluate the damage on the data of the adjacent track based on the damage on the data piece of the data sector DS of the adjacent track, the damage exceeding the level at which the sector read error occurs.

In the above description, the controller 30 resumes the write operation from the position where the write operation is interrupted in response to determining that the accumulated damage evaluation amount CDE is larger than the track error threshold value $Th_{CDE}$ in the second operation (for example, see affirmative determination in S116 in FIG. 11) (See, for example, S118 and S102 in FIG. 11.). However, the position at which the write operation is resumed is not limited thereto. The controller 30 may start the write operation from a circumferential position spaced apart by a space equal to or longer than in the length of one data sector DS in the circumferential direction from a position (for example, the circumferential position of the servo sector SV #(n+1) in FIG. 11) where the write operation is interrupted.

In addition, every time the magnetic head 22 passes over the servo sector SV, the controller 30 calculates the first squeeze amount SQ1 based on the positional error signal PES acquired in the servo sector SV which the magnetic head 22 last passed over. In a case where the first squeeze amount SQ1 exceeds the squeeze amount threshold value $Th_{SQ}$, the first operation is executed (for example, see affirmative determination in S104 of FIG. 11). Then, in a case where the write operation is interrupted in response to determining that the accumulated damage evaluation amount CDE is larger than the track read error threshold value $Th_{CDE}$ in the first operation, the controller 30 may be configured to determine whether to execute the read operation on the adjacent track according to the circumferential position where the write operation is interrupted.

For example, when the length in the circumferential direction from the circumferential position where the write operation is interrupted to the track end is smaller than a predetermined threshold value, the controller 30 may execute the protection operation without executing the read operation or the like on the adjacent track. When the length in the circumferential direction from the circumferential position where the write operation is interrupted to the track end is larger than the predetermined threshold value, the second operation may be executed.

While some embodiments have been described, these embodiments have been presented by way of example only and are not intended to limit the scope of the inventions. Indeed, the novel embodiments described herein can be embodied in a variety of other forms; moreover, various omissions, substitutions and changes can be made without departing from the gist of the inventions. These embodiments or modifications thereof are included in the scope or the gist of the inventions and are included in the inventions described in the claims and an equivalent scope thereof.

What is claimed is:

1. A magnetic disk apparatus comprising:
a magnetic disk including tracks on which servo sectors storing servo information are disposed at intervals in a circumferential direction, the tracks including a first track and a second track, the second track being radially adjacent to the first track and being subject to writing earlier than the first track, each of the first track and the second track including data sectors, the data sectors including a data sector in which an error correction code for error correction in units of tracks is stored;
a magnetic head configured to write data and read data to and from the magnetic disk; and
a controller configured to
read servo information when the magnetic head passes over each of the servo sectors, acquire a positional error signal of the magnetic head based on the read servo information, and execute a write operation on the first track while executing positioning of the magnetic head on the first track based on the positional error signal,
execute a first operation during the write operation in response to the magnetic head passing over a first servo sector, which is one of the servo sectors, the first operation being executed by calculating, based on the positional error signal, an evaluation amount of damage to data of the second track caused by the write operation and comparing a first amount, which is the evaluation amount calculated based on the positional error signal, with a first threshold value corresponding to a correction limit of error correction in units of the tracks,
execute a second operation by interrupting the write operation in response to determining that the first amount is larger than the first threshold value in the first operation, the second operation being executed by executing a read operation on the second track, acquiring a metric representing signal quality of data of the second track read by the read operation, calculating an evaluation amount based on the metric, and comparing a second amount, which is the evaluation amount calculated based on the metric, with the first threshold value,
continue the write operation on the first track in response to determining that the first amount is smaller than the first threshold value in the first operation or determining that the second amount is smaller than the first threshold value in the second operation, and
execute a protection operation of protecting data of the first track in response to determining that the second amount is larger than the first threshold value in the second operation.

2. The magnetic disk apparatus according to claim 1, wherein,
in each of the data sectors, a data piece on which error correction coding for error correction in units of data sectors has been performed is written, and
the controller is configured to, in the first operation,
acquire, for each data sector of the second track, a third amount, which is an amount by which a width of the second track is narrowed, and
acquire the first amount by accumulating or averaging an excessive amount of the third amount, the excessive amount exceeding a second threshold value corresponding to a correction limit of error correction in units of the data sectors.

3. The magnetic disk apparatus according to claim 1, wherein, in each of the data sectors, a data piece on which error correction coding for error correction in units of data sectors has been performed is written, and the controller is configured to, in the second operation, acquire the metric for each data sector of the second track, convert, based on correspondence information, the metric into a fourth amount, which is an amount by which a width of the second track is narrowed, and acquire the second amount by accumulating or averaging an excessive amount of the fourth amount, the excessive amount exceeding a second threshold value corresponding to a correction limit of error correction in units of the data sectors.

4. The magnetic disk apparatus according to claim 1, wherein the controller is configured to, in response to determining that the second amount is smaller than the first threshold value in the second operation, resume the write operation from a circumferential position with a space equal to or longer than a length of one data sector in the circumferential direction from the first servo sector.

5. The magnetic disk apparatus according to claim 2, wherein the controller is configured to, in response to determining that the second amount is smaller than the first threshold value in the second operation, resume the write operation from a circumferential position with a space equal to or longer than a length of one data sector in the circumferential direction from the first servo sector.

6. The magnetic disk apparatus according to claim 3, wherein the controller is configured to, in response to determining that the second amount is smaller than the first threshold value in the second operation, resume the write operation from a circumferential position with a space equal to or longer than a length of one data sector in the circumferential direction from the first servo sector.

7. The magnetic disk apparatus according to claim 1, wherein, in each of the data sectors, a data piece on which error correction coding for error correction in units of data sectors has been performed is written, and the controller is configured to calculate a fifth amount, which is an amount by which a width of the second track is narrowed, based on a positional error signal acquired by a second servo sector, which is a servo sector over which the magnetic head last passed every time the magnetic head passes over each of the servo sectors during execution of the write operation, execute the first operation while regarding the second servo sector as the first servo sector when the fifth amount exceeds a second threshold value corresponding to a correction limit of error correction in units of the data sectors, and determine whether to execute the read operation according to a circumferential position of the first servo sector when the write operation is interrupted in response to determining that the first amount is larger than the first threshold value in the first operation.

8. The magnetic disk apparatus according to claim 2, wherein, in each of the data sectors, a data piece on which error correction coding for error correction in units of data sectors has been performed is written, and the controller is configured to calculate a fifth amount, which is an amount by which a width of the second track is narrowed, based on a positional error signal acquired by a second servo sector, which is a servo sector over which the magnetic head last passed every time the magnetic head passes over each of the servo sectors during execution of the write operation, execute the first operation while regarding the second servo sector as the first servo sector when the fifth amount exceeds a second threshold value corresponding to a correction limit of error correction in units of the data sectors, and determine whether to execute the read operation according to a circumferential position of the first servo sector when the write operation is interrupted in response to determining that the first amount is larger than the first threshold value in the first operation.

9. The magnetic disk apparatus according to claim 3, wherein, in each of the data sectors, a data piece on which error correction coding for error correction in units of data sectors has been performed is written, and the controller is configured to calculate a fifth amount, which is an amount by which a width of the second track is narrowed, based on a positional error signal acquired by a second servo sector, which is a servo sector over which the magnetic head last passed every time the magnetic head passes over each of the servo sectors during execution of the write operation, execute the first operation while regarding the second servo sector as the first servo sector when the fifth amount exceeds a second threshold value corresponding to a correction limit of error correction in units of the data sectors, and determine whether to execute the read operation according to a circumferential position of the first servo sector when the write operation is interrupted in response to determining that the first amount is larger than the first threshold value in the first operation.

10. A method of controlling a magnetic disk apparatus, the magnetic disk apparatus including a magnetic disk and a magnetic head, the magnetic disk including tracks on which servo sectors storing servo information are disposed at intervals in a circumferential direction, the tracks including a first track and a second track, the second track being radially adjacent to the first track and being subject to writing earlier than the first track, each of the first track and the second track including data sectors, the data sectors including a data sector in which an error correction code for error correction in units of tracks is stored, the method comprising:

reading servo information when the magnetic head passes over each of the servo sectors, acquiring a positional error signal of the magnetic head based on the read servo information, and executing a write operation on the first track while executing positioning of the magnetic head on the first track based on the positional error signal;

executing a first operation during the write operation in response to the magnetic head passing over a first servo sector, which is one of the servo sectors, the first operation being executed by calculating, based on the positional error signal, an evaluation amount of damage to data of the second track caused by the write operation and comparing a first amount, which is the evaluation amount calculated based on the positional error signal, with a first threshold value corresponding to a correction limit of error correction in units of the tracks;

executing a second operation by interrupting the write operation in response to determining that the first amount is larger than the first threshold value in the first operation, the second operation being executed by executing a read operation on the second track, acquiring a metric representing signal quality of data of the second track read by the read operation, calculating an evaluation amount based on the metric, and comparing a second amount, which is the evaluation amount calculated based on the metric with the first threshold value;

continuing the write operation on the first track in response to determining that the first amount is smaller than the first threshold value in the first operation or determining that the second amount is smaller than the first threshold value in the second operation; and executing a protection operation of protecting data of the first track in response to determining that the second amount is larger than the first threshold value in the second operation.

11. The method according to claim 10, further comprising writing, in each of the data sectors, a data piece on which error correction coding for error correction in units of data sectors has been performed, wherein the first operation includes acquiring, for each data sector of the second track, a third amount, which is an amount by which a width of the second track is narrowed, and acquiring the first amount by accumulating or averaging an excessive amount of the third amount, the excessive amount exceeding a second threshold value corresponding to a correction limit of error correction in units of the data sectors.

12. The method according to claim 10, further comprising writing, in each of the data sectors, a data piece on which error correction coding for error correction in units of data sectors has been performed, wherein the second operation includes acquiring the metric for each data sector of the second track, converting, based on correspondence information, the metric into a fourth amount, which is an amount by which a width of the second track is narrowed, and acquiring the second amount by accumulating or averaging an excessive amount of the fourth amount, the excessive amount exceeding a second threshold value corresponding to a correction limit of error correction in units of the data sectors.

13. The method according to claim 10, further comprising, in response to determining that the second amount is smaller than the first threshold value in the second operation, resuming the write operation from a circumferential position with a space equal to or longer than a length of one data sector in the circumferential direction from the first servo sector.

14. The method according to claim 11, further comprising, in response to determining that the second amount is smaller than the first threshold value in the second operation, resuming the write operation from a circumferential position with a space equal to or longer than a length of one data sector in the circumferential direction from the first servo sector.

15. The method according to claim 12, further comprising, in response to determining that the second amount is smaller than the first threshold value in the second operation, resuming the write operation from a circumferential position with a space equal to or longer than a length of one data sector in the circumferential direction from the first servo sector.

16. The method according to claim 10, further comprising:

writing, in each of the data sectors, a data piece on which error correction coding for error correction in units of data sectors has been performed;

calculating a fifth amount, which is an amount by which a width of the second track is narrowed, based on a positional error signal acquired by a second servo sector, which is a servo sector over which the magnetic head last passed every time the magnetic head passes over each of the servo sectors during execution of the write operation;

executing the first operation while regarding the second servo sector as the first servo sector when the fifth amount exceeds a second threshold value corresponding to a correction limit of error correction in units of the data sectors; and determining whether to execute the read operation according to a circumferential position of the first servo sector when the write operation is interrupted in response to determining that the first amount is larger than the first threshold value in the first operation.

17. The method according to claim 11, further comprising:

writing, in each of the data sectors, a data piece on which error correction coding for error correction in units of data sectors has been performed;

calculating a fifth amount, which is an amount by which a width of the second track is narrowed, based on a positional error signal acquired by a second servo sector, which is a servo sector over which the magnetic head last passed every time the magnetic head passes over each of the servo sectors during execution of the write operation;

executing the first operation while regarding the second servo sector as the first servo sector when the fifth amount exceeds a second threshold value corresponding to a correction limit of error correction in units of the data sectors; and determining whether to execute the read operation according to a circumferential position of the first servo sector when the write operation is interrupted in response to determining that the first amount is larger than the first threshold value in the first operation.

18. The method according to claim 12, further comprising:

writing, in each of the data sectors, a data piece on which error correction coding for error correction in units of data sectors has been performed;

calculating a fifth amount, which is an amount by which a width of the second track is narrowed, based on a positional error signal acquired by a second servo sector, which is a servo sector over which the magnetic head last passed every time the magnetic head passes over each of the servo sectors during execution of the write operation;

executing the first operation while regarding the second servo sector as the first servo sector when the fifth amount exceeds a second threshold value corresponding to a correction limit of error correction in units of the data sectors; and determining whether to execute the read operation according to a circumferential position of the first servo sector when the write operation is interrupted in response to determining that the first amount is larger than the first threshold value in the first operation.

* * * * *